US012610075B2

(12) United States Patent
Ropert

(10) Patent No.: US 12,610,075 B2
(45) Date of Patent: Apr. 21, 2026

(54) SYSTEMS AND METHODS FOR PROBABILISTIC MESH MOTION ESTIMATION

(71) Applicant: MK Systems USA Inc., Wilmington, DE (US)

(72) Inventor: Michael Ropert, Miniac-Morvan (FR)

(73) Assignee: MK Systems USA Inc., Wilmington, DE (US)

( * ) Notice: Subject to any disclaimer, the term of this patent is extended or adjusted under 35 U.S.C. 154(b) by 15 days.

(21) Appl. No.: 18/609,937

(22) Filed: Mar. 19, 2024

(65) Prior Publication Data

US 2024/0364912 A1 Oct. 31, 2024

(30) Foreign Application Priority Data

Apr. 19, 2023 (EP) ..................................... 23305603

(51) Int. Cl.
*H04N 19/51* (2014.01)
*H04N 19/159* (2014.01)
*H04N 19/597* (2014.01)

(52) U.S. Cl.
CPC ........... *H04N 19/51* (2014.11); *H04N 19/159* (2014.11); *H04N 19/597* (2014.11)

(58) Field of Classification Search
None
See application file for complete search history.

(56) References Cited

U.S. PATENT DOCUMENTS

2007/0291845 A1 * 12/2007 Cammas .............. H04N 19/553
375/E7.11
2023/0070514 A1 * 3/2023 Yuan ........................ G06T 17/00
2024/0205407 A1 * 6/2024 Tokumo ................... G06T 9/001

OTHER PUBLICATIONS

European Patent Office, Communication, Extended Search Report issued for European Patent Application No. 23305603.5, dated Oct. 10, 2023, 7 pages.
Goswami, K. et al. "A Probabilistic Adaptive Algorithm for Constructing Hierarchical Meshes," IEEE Transactions on Consumer Electronics, vol. 55. No. 3, Aug. 2009, pp. 1690-1698, 9 pages.
Goswami, K. et al. "Adaptive Node Dimension (AND) Calculation Algorithm for Mesh Based Motion Estimation," IEEE International Conference on Consumer Electronics (ICCE—Berlin), 2011, 5 pages.
Turaga, D. S. et al. Classification Based Mode Decisions for Video over Networks, IEEE Transactions on Multimedia, vol. 3, No. 1, Mar. 2001, 12 pages.

* cited by examiner

*Primary Examiner* — Christopher G Findley
(74) *Attorney, Agent, or Firm* — Norton Rose Fulbright US LLP

(57) ABSTRACT

Disclosed herein are systems, devices and methods for probabilistic mesh motion estimation. The systems, devices and methods can involve an encoder, appliance, or other device for processing the video data to estimate motion in one or more locations of the video data using probabilistic mesh motion estimation based on a motion model. The encoder can introduce inter-probability in the motion model for appearing areas in the video data in conjunction with using the probabilistic mesh motion estimation. The encoder can introduce a probability that regions in the video data are intra-regions or inter-regions in the motion model as weights to indicate a confidence of finite elements being inter-associated. The encoder can use master and slave nodes and over-splitting for mesh continuity preservation. The encoder can use a non fully connected mesh applicable to video coding standards.

15 Claims, 28 Drawing Sheets

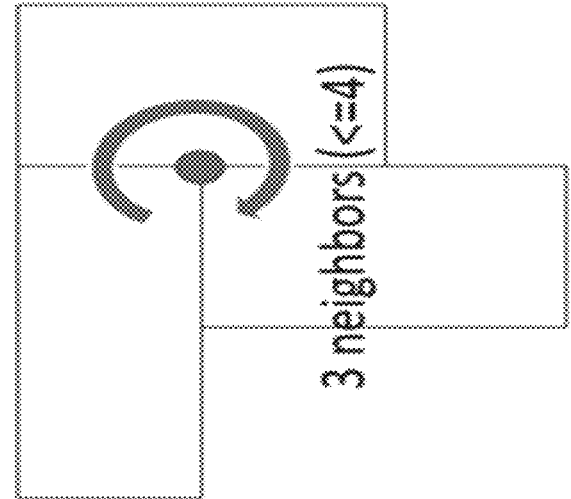
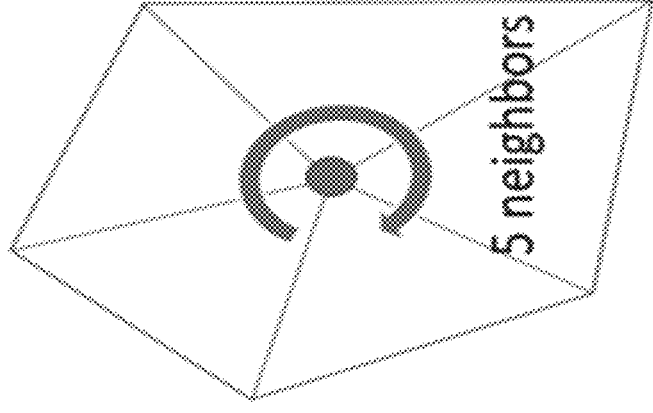
FIG. 4

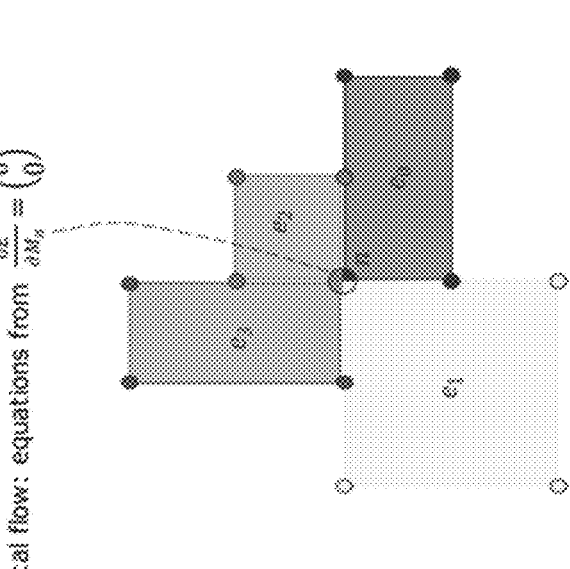

Block based optical flow on images

Optical flow: equations from $\dfrac{\partial E}{\partial M_k} = \begin{pmatrix} 0 \\ 0 \end{pmatrix}$ $$\sum_{n \in S(n)} \sum_{k \in V(n)} \begin{pmatrix} G_{x,x}^{k,n} & G_{x,y}^{k,n} \\ G_{y,x}^{k,n} & G_{y,y}^{k,n} \end{pmatrix} \begin{pmatrix} u_k \\ v_k \end{pmatrix} = -\sum_{n \in S(n)} \begin{pmatrix} F_x^n \\ F_y^n \end{pmatrix}$$

where $G\ \xi_{x,y}^{k,n} = \sum_{r \in c} \varphi_{k_x}(r)\, \varphi_{n_x}(r)\, I_x(r)\, I_y(r)$ and $\quad F_\xi^k = \sum_{r \in c} \varphi_{k_\xi}(r)\, I_\xi(r)\, DFD(r)$ Support of $n$: $S(n) = (e_0, \ldots, e_3, e_3)$ Vertices of $e_0$: $V(e_0) = (\bullet \cup \bullet)$ Vertices of $e_1$: $V(e_1) = (\bullet \cup \circ)$ Vertices of $e_2$: $V(e_2) = (\bullet \cup \bullet)$ Vertices of $e_3$: $V(e_3) = (\bullet \cup \bullet)$

FIG. 5

FIG. 7

An end-to-end media pipe

SYSTEMS AND METHODS FOR PROBABILISTIC MESH MOTION ESTIMATION

CROSS REFERENCE

This application is related, and claims benefit of priority, to European Patent Office Application No. 23305603.5 entitled "Systems and Methods for Probabilistic Mesh Motion Estimation," filed Apr. 19, 2023, the disclosure of which is incorporated herein by reference in its entirety.

FIELD

This disclosure relates to encoding or processing data, and more particularly relates to encoding or processing live content data or on demand content data.

BACKGROUND

Video coding systems can have encoding or processing devices that use motion estimation and compensation techniques. Motion estimation is the process of determining motion vectors that describe the motion of content data, or the transformation from one image to another image.

For encoding live content data and on-demand content data, several motion estimation operations can be performed by an encoder in the look ahead or in the CODEC itself. For example, a hierarchical block matching process (or variations around it) can be used by the encoder for encoding content data.

Motion vectors can be represented by a translational motion model, for example. Other models can also be used to approximate the motion of content data. For example, more complex motion models (e.g. an affine motion model for VVC) can also be used for motion estimation.

There exists a need for improved processes for motion estimation, or at least alternatives.

SUMMARY

Embodiments described herein relate to systems and methods for mesh motion estimation, and in particular, embodiments described herein relate to systems, methods, and devices for probabilistic mesh motion estimation.

In an aspect, there is provided a computer-implemented system for probabilistic mesh motion estimation. The system has: at least one processor, and memory in communication with the at least one processor. The memory stores software code, which when executed by the at least one processor causes the processor to process video data to estimate motion in one or more locations of the video data using probabilistic mesh motion estimation based on a motion model. In some embodiments, the system encodes (or compresses) the video data using the estimated motion.

In some embodiments, the system has a transceiver for receiving and transmitting the video data.

In some embodiments, the memory stores the video data.

In some embodiments, the processor is an encoder, the encoder comprising a preprocessor, a look-ahead, and a codec.

In some embodiments, the processor introduces inter-probability in the motion model for appearing areas in the video data in conjunction with using the probabilistic mesh motion estimation.

In some embodiments, the processor introduces a probability that regions in the video data are intra-regions or inter-regions in the motion model as weights to indicate a confidence of finite elements being inter-associated.

In some embodiments, the processor uses master and slave nodes and over-splitting for mesh continuity preservation.

In some embodiments, the encoder uses a non fully connected mesh applicable to video coding standards for compression and preprocessing.

In some embodiments, the processor implements dedicated splitting for motion continuity preservation.

In some embodiments, the encoder uses probabilistic mesh motion estimation for compression of the video data.

In some embodiments, the look-ahead implements probabilistic mesh motion estimation.

In some embodiments, the codec implements probabilistic mesh motion estimation.

In some embodiments, the preprocessor implements probabilistic mesh motion estimation.

In another aspect, there is provided a computer-implemented method for probabilistic mesh motion estimation. The method involves: processing the video data to estimate motion in one or more locations of the video data using probabilistic mesh motion estimation based on a motion model; and transmitting or storing the video data.

In some embodiments, the method involves introducing a probability that regions in the video data are intra-regions or inter-regions in the motion model as weights to indicate a confidence of finite elements being inter-associated.

In another aspect, there is provided an appliance device for probabilistic mesh for motion estimation. The device has: at least one processor; memory in communication with the at least one processor; software code stored in the memory, which when executed at the at least one processor causes the device to process the video data to estimate motion in one or more locations of the video data using probabilistic mesh motion estimation based on a motion model.

In some embodiments, the at least one processor uses master and slave nodes and over-splitting for mesh continuity preservation.

In some embodiments, the at least one processor uses a non fully connected mesh applicable to video coding standards.

In some embodiments, the at least one processor implements dedicated splitting for motion continuity preservation.

Many further features and combinations thereof concerning embodiments described herein will appear to those skilled in the art following a reading of the instant disclosure.

BRIEF DESCRIPTION OF THE DRAWINGS

In the figures,

FIG. 4 is an example of variable number neighboring finite elements (FEs);

FIG. 5 is an example diagram and equations for block based optical flow on images;

FIG. 7 is of example modified equations for optical flow;

Figure 1:
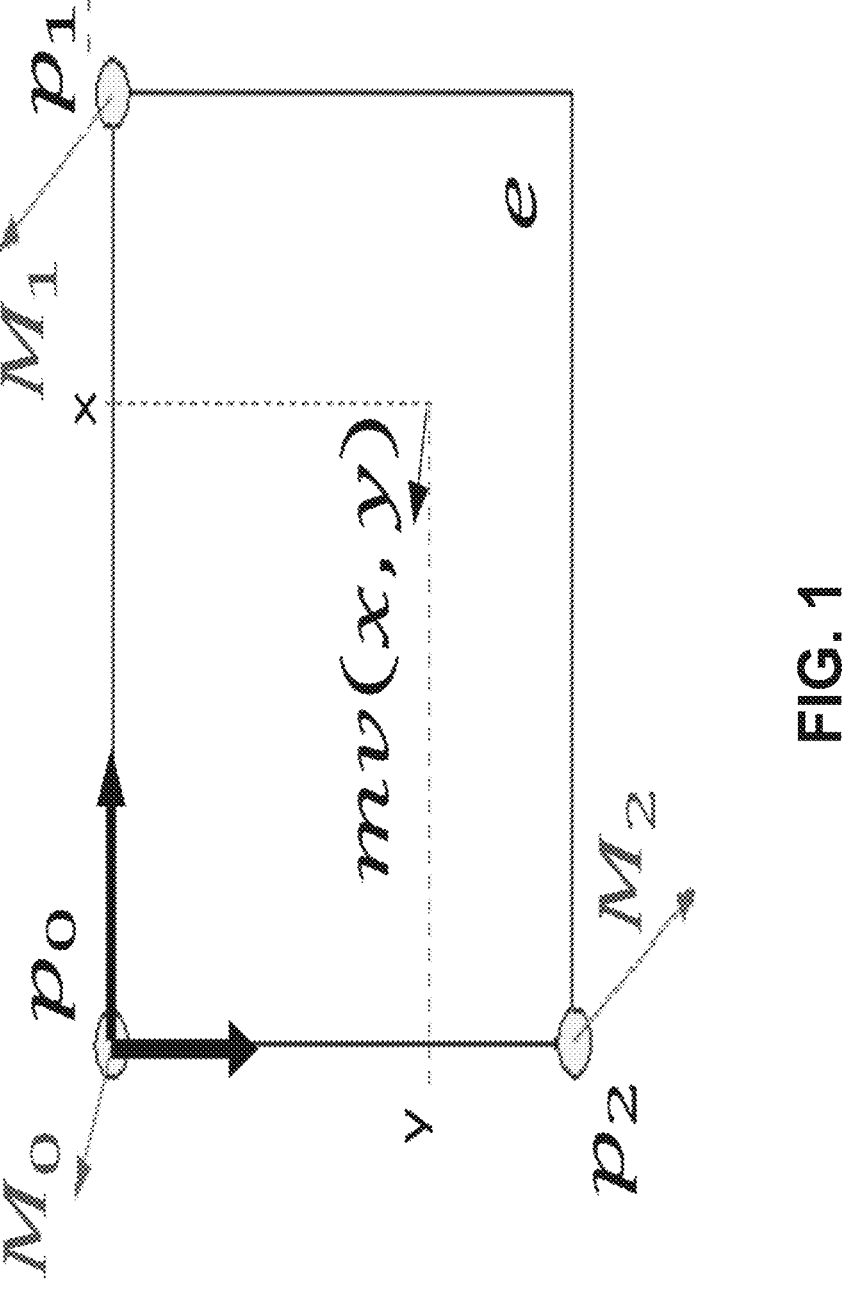
FIG. 1 is a schematic diagram of affine motion compensation using three control points.

These drawings depict exemplary embodiments for illustrative purposes, and variations, alternative configurations, alternative components and modifications may be made to these exemplary embodiments.

DETAILED DESCRIPTION

Embodiments described herein provide computer-implemented systems and methods for probabilistic mesh motion estimation. The systems and methods can involve processing video data to estimate motion in one or more locations of the video data using probabilistic mesh motion estimation based on a motion model. The systems and methods can involve using the estimated motion in the one or more locations of the video data, such as by encoding (or compressing) the video data using the estimated motion. Encoders or processing devices use motion estimation. For encoding live content data and on-demand content data, several motion estimation operations can be performed by an encoder or processing device in the look ahead (as an example, the preprocessing embeds spatiotemporal filter where the pixels involved in the filtration are obtained by motion estimation) or in the codec itself (in encoders, the estimated motion information is extracted from the sequence and sent to the decoder in such a way the decoder can predict the current image by applying the motion from the previous decoded ones). Standard hierarchical block matching (or variations thereof) may be used by encoder or processing device, for example. The term encoder as used herein can refer to a hardware device that implements motion estimation. Motion estimation is utilized for many purposes as a processing technique for images and video. Examples uses for hardware devices or appliances that implement motion estimation include (but are not limited to): super-resolution (e.g. in television or video display device wherein estimated motion is used to select pixels in previous images in addition to the pixels of the current image to recreate inter-pixel information by interpolation); object tracking (e.g. in simulators such as golf simulators); video shaking removal (e.g. in cameras wherein global motion is estimated and compensated to realign the content image per image); frame rate conversions (e.g. in video system diffusion such as conversion from 25 Hz Phase Alternating Line encoding system to to 29.97 Hz National Television System Committee); human computer interactions, such as hand posture analysis, human posture analysis, gesture controlled gaming, lip movement for user authentication; compression; spatio-temporal filtering (e.g. in pre-processing of encoders); robotics (e.g. robotic heart surgery). Devices that utilize motion estimation can utilize probabilistic mesh motion estimation according to embodiments described herein.

Motion estimation can involve motion vectors that may be represented by a motion model to approximate the motion of content data. For example, a translation motion model may be used for motion estimation. However, compression efficiency may not evolve according to future standards. Motion estimation may involve complex motion models (e.g. affine motion model for VVC). If more complex motion models are not used, then video quality for both special applications and video compression may be blocked at a certain level.

Embodiments described herein relate to systems and methods for probabilistic mesh motion estimation (MME). Embodiments described herein relate to systems and methods for MME implemented in real-time. Embodiments described herein relate to systems and methods that adapt MME to the compression.

Embodiments described herein relate to probabilistic MME that can introduce inter-probability in the motion model (e.g. for appearing areas in the video). Embodiments described herein relate to probabilistic MME that can use a master and slave node concept, and over splitting for mesh continuity preservation. Embodiments described herein relate to probabilistic MME that can use a non-fully connected mesh applicable to versatile video coding (VVC).

Embodiments described herein aim to solve the aperture problem in motion estimation techniques. The aperture problem arises because, given the observed data, only motion along the direction perpendicular to the edge or element can be observed, rather than in the direction of motion itself. The aperture problem may be solved by propagating the motion already known. However, this propagation may generate a lexicographic casual dependency that is not present in MME. Accordingly, embodiments described herein provide an improved solution for the aperture problem.

Known motion estimation technique can block on evolutions. Without mesh motion estimation, motion projection (e.g. deduce future motion from current motion) can be difficult. Super resolution that requires a good motion estimation may be improved according to embodiments described herein. Frame rate change that requires the introduction of a good motion estimation may be improved according to embodiments described herein.

With mesh motion estimation, the compression efficiency can be improved. With mesh motion estimation, the motion field can be smooth and predictable, and motion projection is possible (e.g. tracking, shaking removal). The computational cost should be close to other motion estimation processes, such as a block matching.

There may be a drawback with MME when regions appear in the video. The mesh stretches on these regions and impacts the accuracy of surrounding motion areas. It may be suitable to tear the mesh at some locations. Instead, embodiments described herein propose to identify these regions as "INTRA" according to the compression paradigm. Normally, these regions are identified with a failure in the motion estimation. Instead, embodiments described herein propose to address this dilemma by the introducing the probability of being an INTRA region in the model of the MME which results in probabilistic mesh motion estimation. Accordingly, embodiments described herein relate to systems and methods for probabilistic mesh motion estimation. At the limit, this probability can be replaced by 0 or 1, fixing which area is an INTRA region and which is INTER region.

In another aspect, embodiments described herein relate to systems and methods for probabilistic MME for dedicated splitting for motion continuity preservation.

In a further aspect, embodiments described herein relate to systems and methods for probabilistic MME that can use the non-fully connected mesh for VVC.

Currently MME is not used for video compression. Use of MME for video compression can potentially result in multiple embodiments. In accordance with embodiments described herein, MME can be used for video compression and applied in the look ahead of encoders.

Motion estimation or optical flow is a method of calculating the motion of image intensities. In case of pure optical flow estimation, a motion vector must be computed for each pixel, which is computationally expensive. MME consists of estimating the motion only on some locations, e.g., the motion for pixels surrounded by pixels where the motion is known by being deduced by interpolation. Accordingly, the number of motion vectors to be estimated is lower, making a real time computation possible.

With VVC, the notion of interpolated motion appears with the affine motion compensation where the motion is interpolated from motion vector control points. FIG. 1 is a diagram of affine motion compensation defined by three control points as an illustrative example. Motion vector $mv(x,y)$ can be obtained from control points $M_0$, $M_1$ and $M_2$.

The introduction of the mesh in combination with the optical flow technique can reduce the entropy of the motion vector control points. This can improve the motion vectors compression efficiency. The mesh structure is generally based on a similar concept as partitioning that is used in codecs, e.g., rectangles with various sizes and various connectivity since High Efficiency Video Coding (HEVC).

Figure 2:
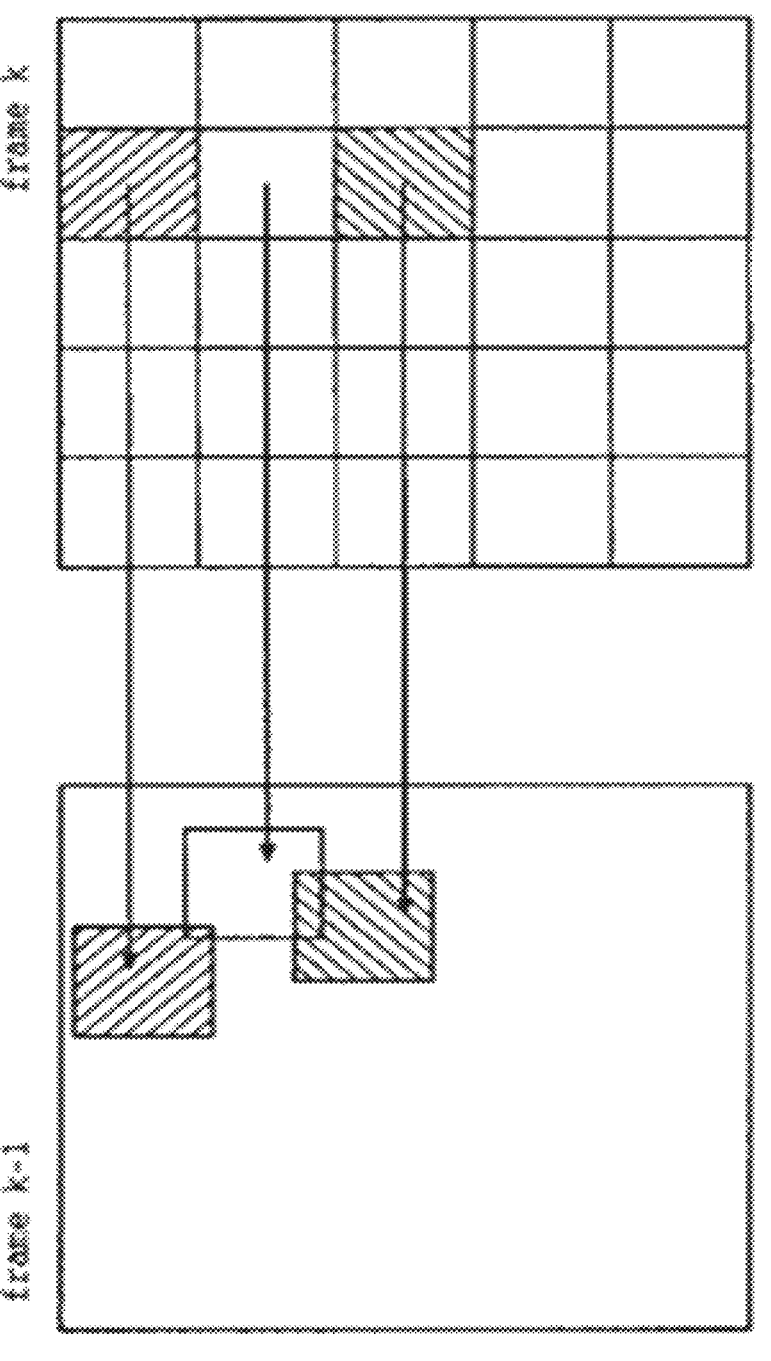
FIG. 2 is a schematic diagram of an example of per block motion estimation, or block matching.

FIG. 2 is a diagram of an example of per block motion estimation, or block matching. A motion vector per block (as shown in FIG. 2) produces a discontinuous motion vector field. In contrast, a motion mesh produces a smooth motion vector field.

Figure 3:
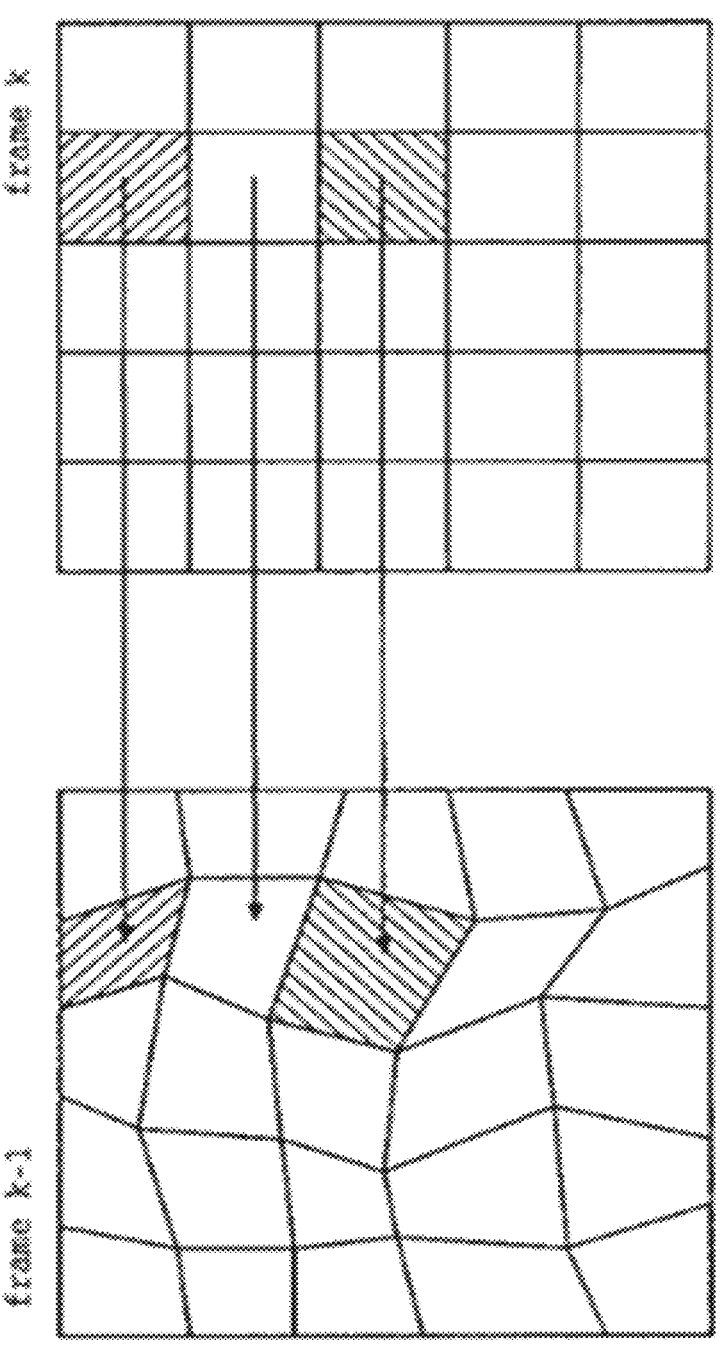
FIG. 3 is a schematic diagram of an example of mesh-based motion estimation.

FIG. 3 is a diagram of an example of mesh-based motion estimation, or MME. Reference areas land into a defined shape (rectangles in this example) by motion compensation. The defined shapes can be referred to finite elements (FEs). The model for the displacement is linked to the landing shape, such as affine for triangles, bilinear for rectangles, and so on.

Historically, MME was done on triangles because most of software libraries for simulations were available with triangles. However, MME can be implemented on various shapes. Rectangles can provide advantages. For example, rectangles are well adapted to video compression block-based standards. Further, the hierarchical approach (to catch big motions) is as simple with rectangles as with triangles. In case of splitting, compared to a triangular partitioning, the number of neighbors is fixed for a regular mesh: one corner (i.e., node) is the connection of four rectangles (i.e., FEs) and bounded to four for non-regular rectangular meshes.

FIG. 4 is a diagram of an example of triangular variable number neighboring FEs as compared to rectangular maximum of four FEs.

Furthermore, the continuity preservation of the motion field can be addressed mixing rectangles and triangles. In this description, FE can have standing for various shapes, such as rectangles, triangles or other shapes. The case of the "triangles-rectangles" mix is not described in detail for simplicity, and instead the illustrative examples focus only on rectangles. However, there can be a mix of shapes for various embodiments.

The technique for MME mixes FE theory and optical flow equations. The equations suitable for triangles can be extended to rectangles.

FIG. 5 shows an example diagram and equations for block based optical flow on images. The standard MME process minimizes the mean square error between the original image and the motion compensated image. This leads to equations per node numbered "n" shown in FIG. 5. The equations are gathered in a huge sparse matrix which is to be solved.

Figure 6:
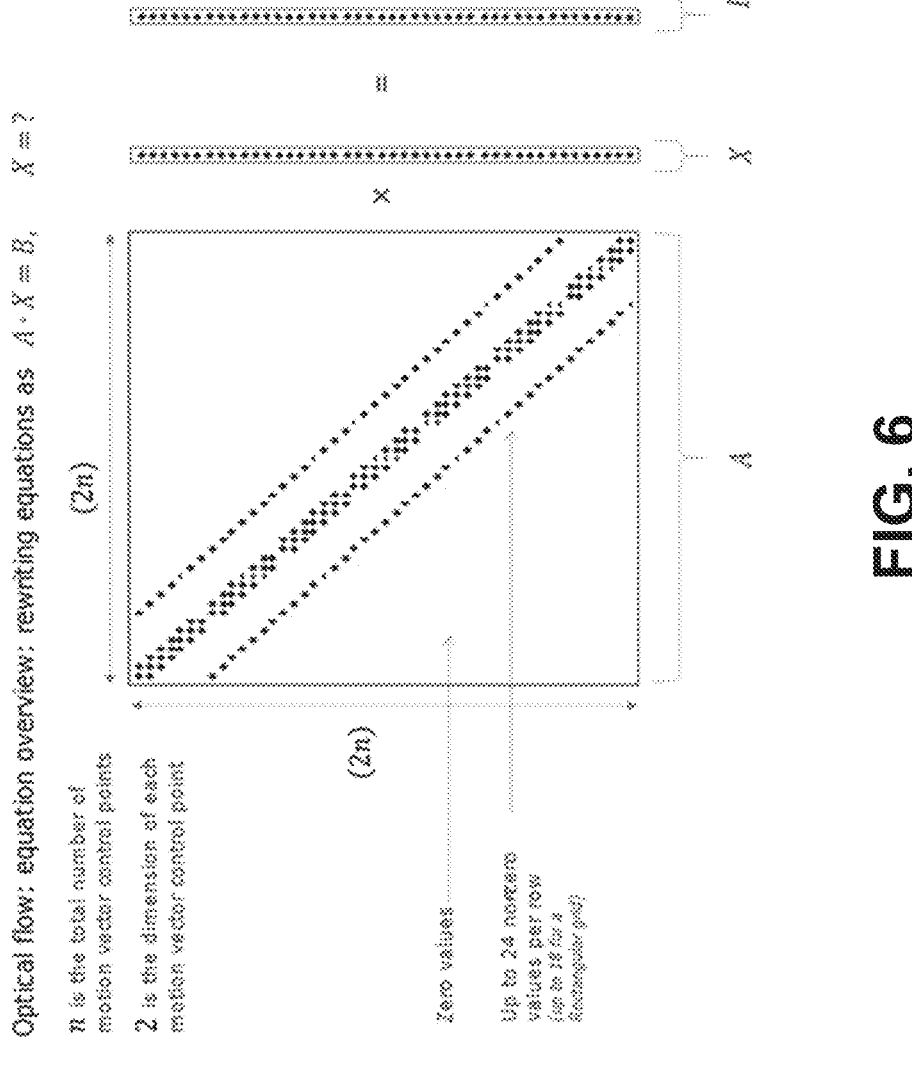
FIG. 6 is a schematic view of the block based optical flow equations on images written as a product of matrices: non-zero coefficients are black dots and zeros values are white areas.

FIG. 6 shows a further example diagram and equations for block based optical flow on images. The X vector containing the motion vectors are obtained solving A X=B.

Embodiments described herein relate to systems and methods that (i) introduce inter-probability in the motion model (for appearing areas in the video); (ii) involve master and slave nodes and over splitting for mesh continuity preservation; and/or (iii) apply the non fully connected mesh to video coding standards such as Versatile Video Coding (VVC).

Introduction of INTER Probability

For compression of content data, there is INTRA prediction and INTER prediction. INTER means the rectangle (FE) is predicted via motion, and INTRA means that the rectangle is predicted from surrounding areas. Typically, appearing areas would require to be INTRA-coded. Occlusions would require a non-manifold mesh or at least a discontinuity in the mesh, as connected regions in the image to be predicted are disconnected in the reference image.

Compression algorithms deal with INTRA or INTER concepts, and sometimes a combination of both.

The motion estimation aims to compute the displacement. The INTER vs. INTRA probability can be introduced in the mesh model as a weight to indicate the confidence of being INTER associated to each FE. This concept can be introduced in the model, providing a good estimation for probably-INTER FE and a not-of-interest value for motion of FE with a high INTRA probability. These FE can be further encoded as INTRA. As their weight is low, they have less negative impact on the estimation of INTER FEs. This can globally improve the mesh motion estimation accuracy.

FIG. 7 is a diagram of example modified equations for optical flow. In the same manner, all the equations are gathered in the huge matrix form and solved to extract the motion vectors.

Mesh Splitting

Embodiments described herein relate to mesh splitting, or over-splitting for motion continuity preservation.

To refine the motion at some location, the mesh can be partitioned. This partitioning generates FEs with different sizes around a node. At the same time, the partitioning of the mesh should be adapted or mapped to the compression technique (depending on the standard, allowed partitions vary).

In this context, the problem to solve is the motion continuity problem. Given a splitting algorithm, the mesh, even if rectangular becomes non-regular, i.e. the number of connected FE to a node can be less than four.

Embodiments described herein can involve slave and master nodes. The following definitions can apply: The master node can be defined as "free to move". The master nodes have four connected nodes or belongs to the border of the mesh. The slave node can be a constrained node, not to be estimated, but with a motion that can be computed from its two connected master nodes.

Embodiments described herein can involve continuous mesh splitting (e.g. splitting without introducing any discontinuity). Embodiments described herein can involve introducing INTER/INTRA probability in the mesh. Embodiments described herein can involve introducing discontinuities. Setting an INTER probability to zero for a finite element can directly introduce a discontinuity all around the considered finite element.

As an illustrative example, consider the case of a fully-connected mesh, such as a mesh composed of rectangular FEs with four motion vector control points per FE and a bilinear model displacement model.

Figure 8:
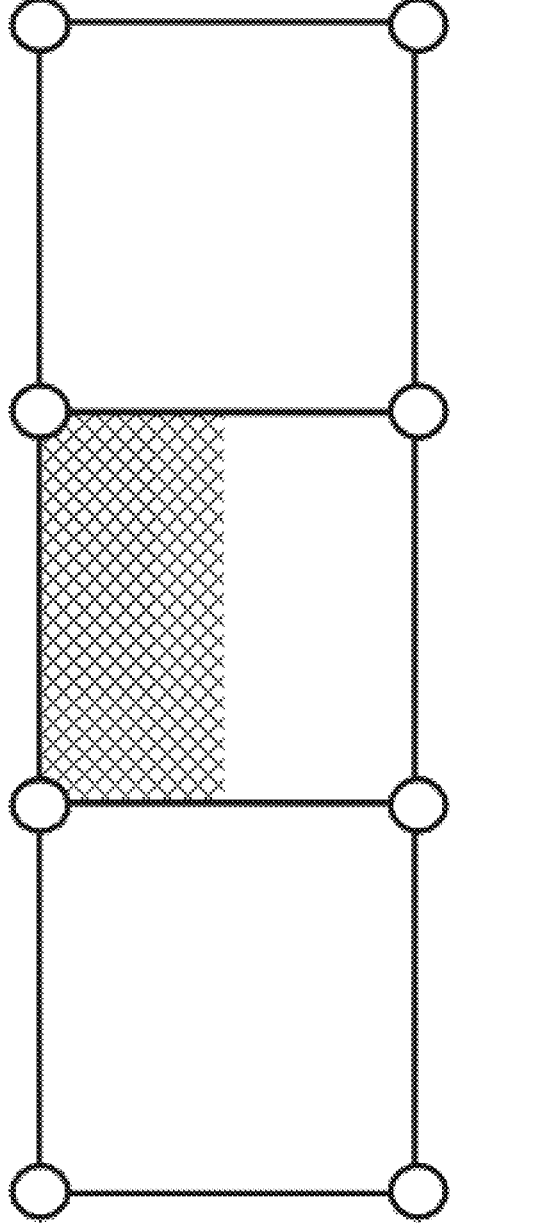
FIG. 8 is an example that can exhibit how discontinuity in the motion field does not match with the rectangle shapes.

FIG. 8 shows an example that can exhibit how discontinuity in the motion field does not match with the rectangle shapes. From three consecutive blocks, the central block can be split horizontally, because the top part of the error at the top of central block is considered as excessive, and we want to refine the motion in this central block. In this example of FIG. 8 the level of reconstruction error can decide the splitting.

Figure 9:
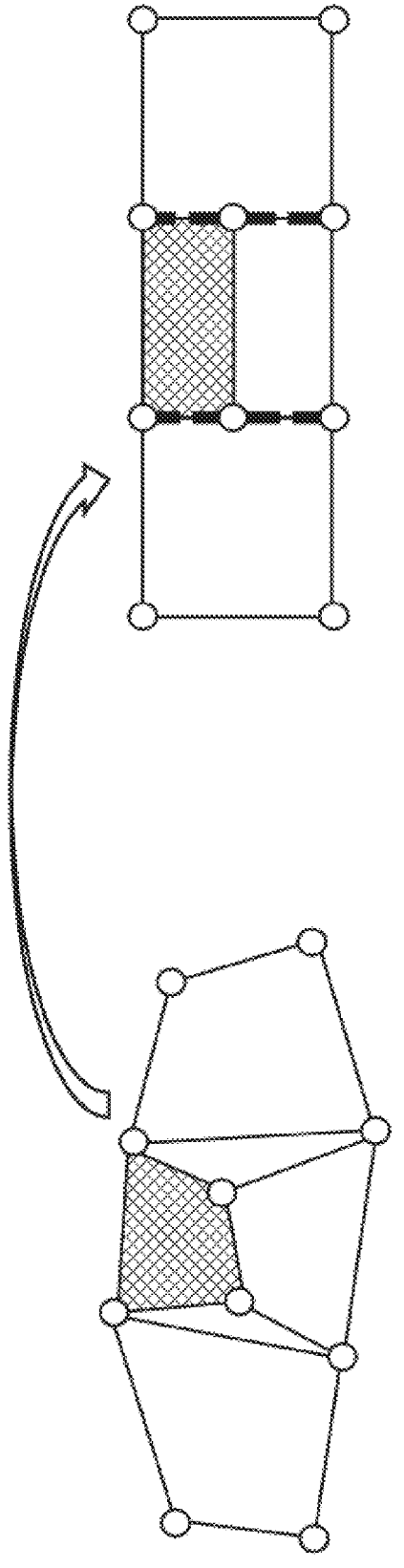
FIG. 9 is example with vertical discontinuities generated by a horizontal split.

FIG. 9 shows the example with vertical discontinuities generated by a horizontal split. To split the central block, at least 2 nodes are introduced. Now, considering the reference picture, blocks where pixels come from, the introduction of two nodes to split horizontally the central block can make the origin of the pixels different on the two sides of the vertical junctions (in dashed lines). Consequently, this produces a vertical motion discontinuity. Indeed, some parts in the original image (e.g. the two triangles of FIG. 9) are unused. This introduces a discontinuity at the reconstruction side due to pixels coming from different locations (disconnected pixels).

Figure 10:
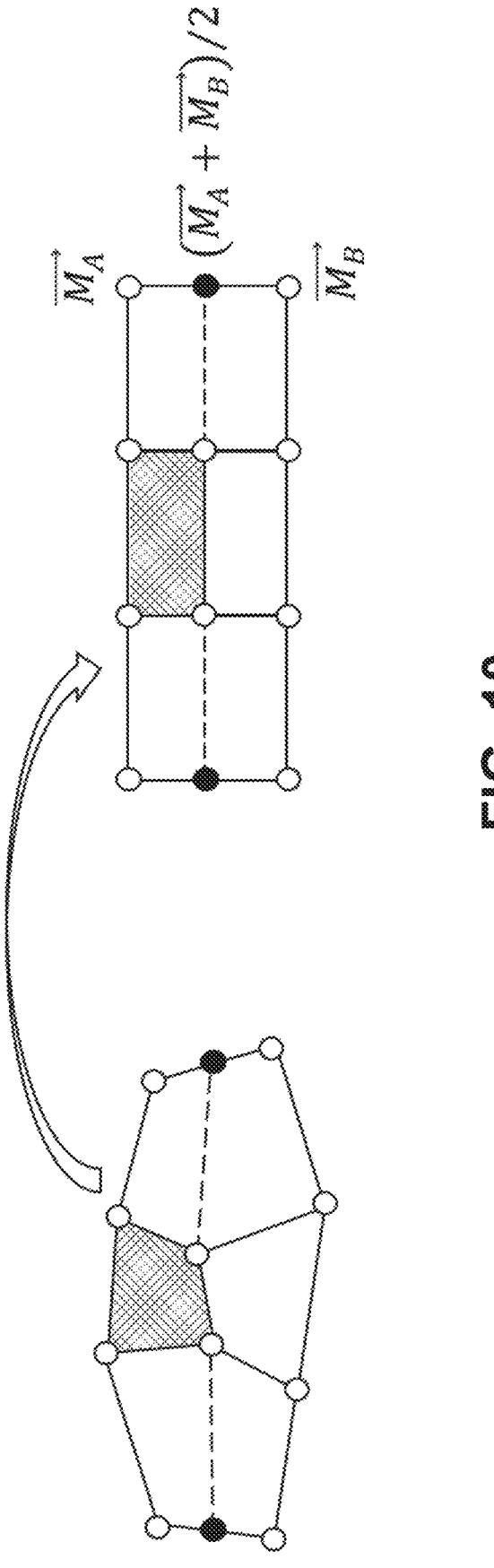
FIG. 10 shows an example with continuous mesh splitting with horizontal splitting without discontinuities.

To keep motion continuity, a "two-types" of nodes concept can be introduced. This technique can be referred to as "continuous mesh splitting". FIG. 10 shows the example with continuous mesh splitting with horizontal splitting without discontinuities. In this example, there are nodes belonging to the optimization problem (in white, where to estimate the motion), and nodes that are slaves (in black). The motion is deduced from connected node motion values.

Forcing motion vectors to the mean of (in this example) the top and the bottom node motion values, motion continuity is conserved. And furthermore, the two new (now) white nodes are free to move.

Figure 11:
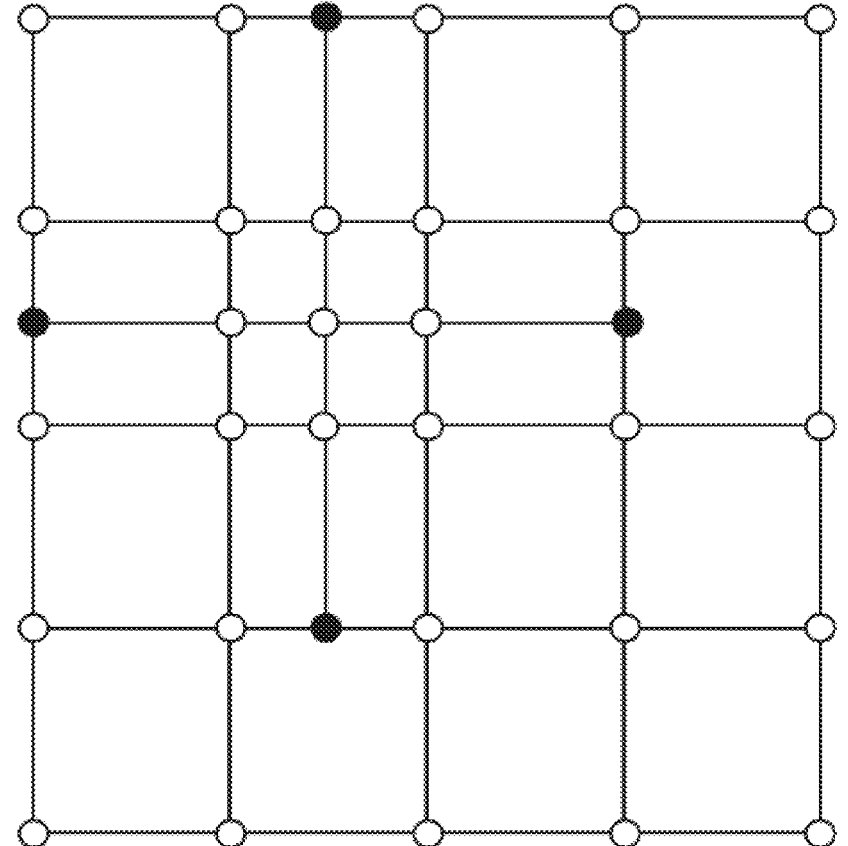
FIG. 11 is an example of the first pass for splitting using the two-types node technique.

Continuous quad splitting is implemented with a "two-types node technique". FIG. 11 shows an example of the first pass for splitting using the two-types node technique. In this example, for the first pass, black nodes are motion constrained, and white point and border points are free to move.

Different types of splitting horizontal, vertical, quad, ternary trees, have to be over split to keep the continuity of the motion field. Once new (master and slaves) nodes are positioned, a second pass is required on the field to modify the nature of some slave nodes to master nodes. A slave node becomes a master in two cases: (i) the slave node belongs to the border, and (ii) the slave node is connected to four nodes.

Figure 12:
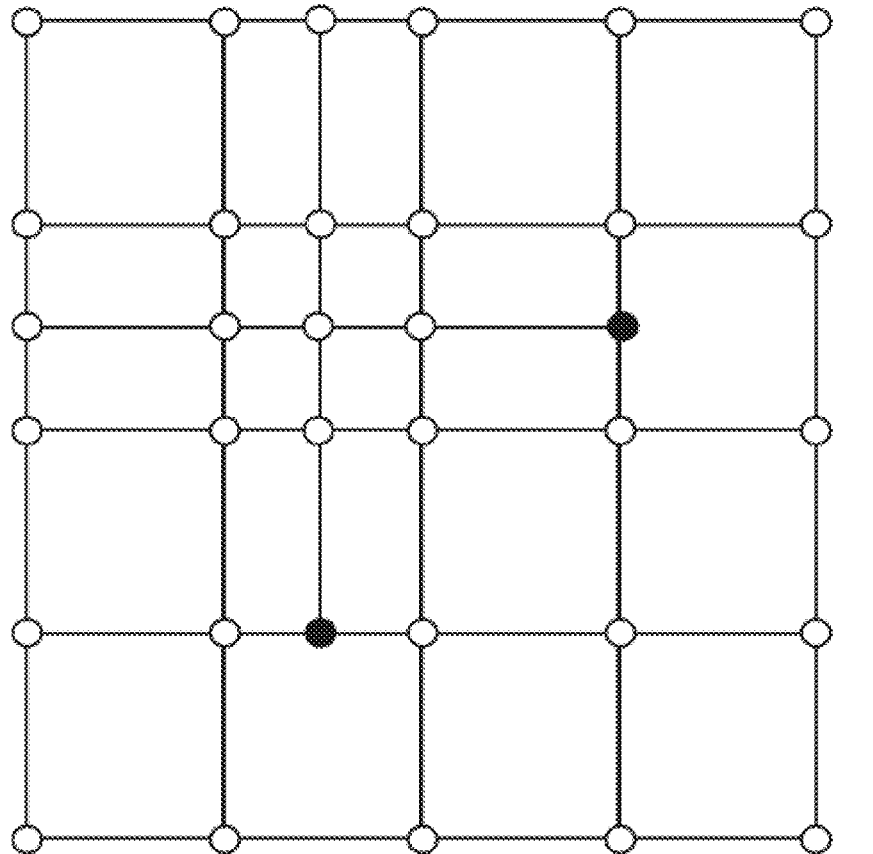
FIG. 12 is an example of the second pass for splitting using the two-types node technique.

FIG. 12 shows an example of the second pass for splitting using the two-types node technique. In this example, for the second pass, some black nodes (slave nodes) become white (master nodes) and free to move.

Figure 12A:
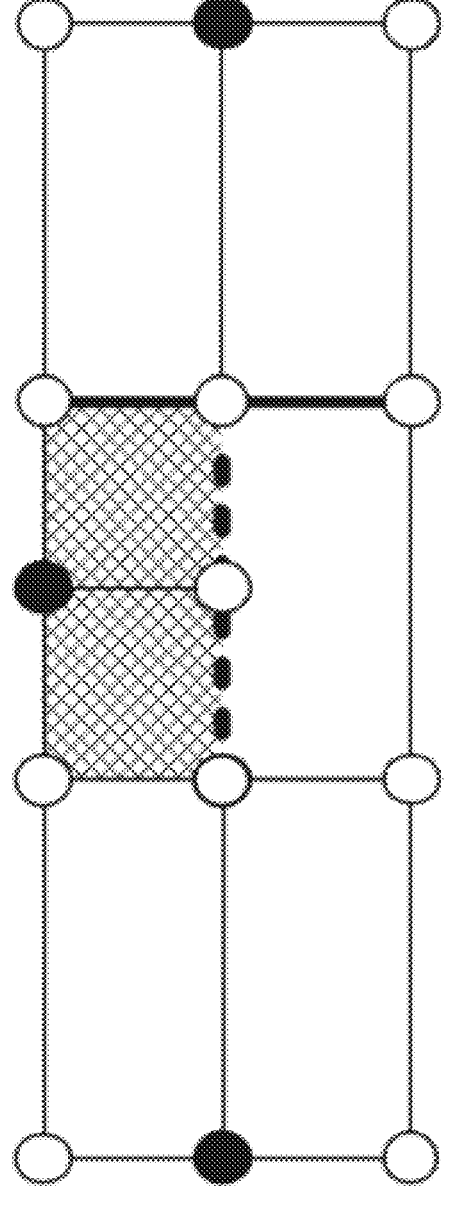
FIG. 12A is an example of splitting to introduce the horizontal discontinuity.

The following provides another example splitting rule: if the split generates a connection with a node that already exists, it becomes a master node whatever its initial nature (master or slave). The splitting may be done by discontinuity introduction. To introduce a discontinuity at specific location, the splitting must occur in a more sophisticated manner. Referring back on FIG. 8, to introduce the horizontal discontinuity, splitting may be as shown in FIG. 12A. Ad hoc splitting can result in the introduction of horizontal discontinuity (shown in dashed lines).

There can be an alternative to discontinuous splitting. For example, the splitting can be in a continuous way and introduce the probability of being INTRA. There is the possibility of not finding a corresponding area in the reference image.

Figure 12B:
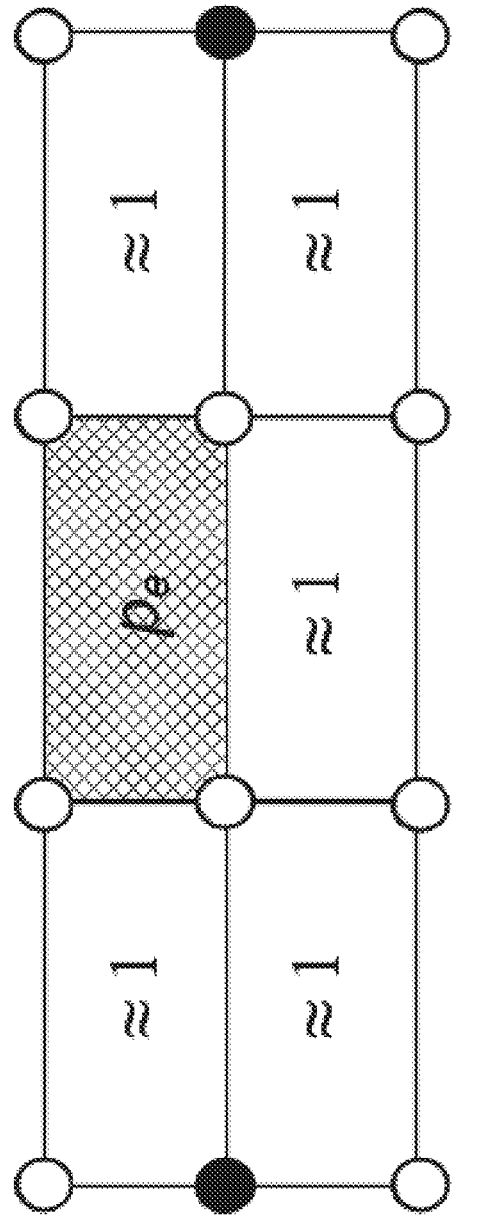
FIG. 12B shows an example diagram of the introduction of INTER probability with the continuous splitting.

FIG. 12B shows an example diagram of the introduction of INTER probability with the continuous splitting.

The remaining difficulties are the estimation of $p_e$ the intra probability, and the objective function to minimize that should not degenerate with manipulations done by $p_e$. A first estimate of $p_e$ could be:

$$p_e = \frac{\varepsilon_{INTRA_e}}{\varepsilon_{INTRA_e} + \varepsilon_{INTRA_e}}$$

Where $\varepsilon_{INTRA_e}$ and $\varepsilon_{INTER_e}$ are reconstruction errors (respectively from some INTRA prediction and INTER prediction).

As noted, there can be INTER probability and INTRA probability introduced in the motion model. It can be shown (see Annex 1) that an additional variable attached to the finite element (FE) is enough to define $p_e$ the probability of one element e to be INTER. In that case, the matrixial equation attached to the node n is given by:

$$\sum_{e \in S(n)} p_e \sum_{k \in V(e)} \sum_{r \in e} \varphi_{k_e}(r) \varphi_{n_e}(r) \nabla(r) \cdot \nabla(r)^T \cdot M_{k_e} =$$
$$-\sum_{e \in S(n)} p_e \sum_{r \in e} \varphi_{n_e}(r) \nabla(r) FD(r)$$

It can be rewritten for a better readability as:

$$\sum_{e \in S(n)} p_e \sum_{k \in V(e)} \begin{pmatrix} G_{x,x}^{k,n} & G_{x,y}^{k,n} \\ G_{x,y}^{k,n} & G_{y,y}^{k,n} \end{pmatrix} \begin{pmatrix} u_k \\ v_k \end{pmatrix} = -\sum_{e \in S(n)} p_e \begin{pmatrix} F_x^n \\ F_y^n \end{pmatrix}$$

-continued $$\text{where } G_{x,y}^{k,n} = \sum_{r \in e} \varphi_{k_e}(r) \varphi_{n_e}(r) \nabla_x(r) \nabla_y(r)$$

$$\text{and } F_x^k = \sum_{r \in e} \varphi_{k_e}(r) \nabla_x(r) FD(r)$$

The previous equations describe two rows of a wide matrixial system $\mathbb{A} \, \mathbb{M} = \mathbb{B}$, where the sub-bloc 2×2

$$\mathbb{A}_{ij} = \sum_{e \in S(n)} p_e \sum_{k \in V(e)} \delta_{k,j} \sum_{r \in e} \varphi_{i_e}(r) \varphi_{k_e}(r) \nabla(r) \cdot \nabla(r)^T$$

and the sub vector 2×1

$$\mathbb{B}_i = -\sum_{e \in S(i)} p_e \sum_{r \in e} \varphi_{i_e}(r) \nabla(r) FD(r)$$

Despite the introduction of $p_e$ values, $\mathbb{A}$ remains symmetric and sparse.

Figure 24:
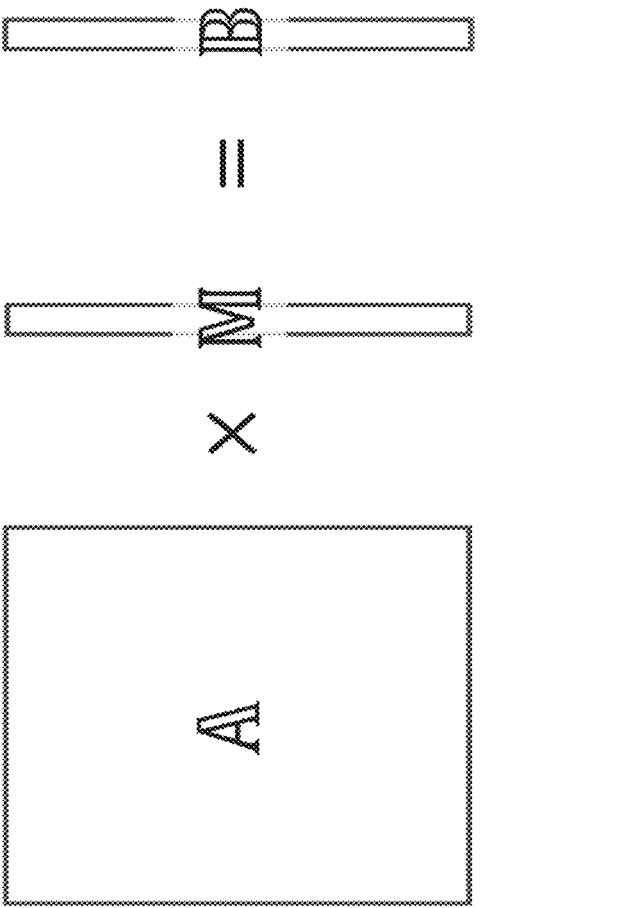
FIG. 24 shows an example matrixial system.

The matrixial system is shown in FIG. 24.

Embodiments described herein can handle continuities and discontinuities.

Continuity constraints can be introduced at specific locations to keep the mesh connected. It can be shown that the set of additional continuity constraints can be injected directly in the equation system. This can lead to a complex solution that can be difficult to implement due to enlargement of the dependencies between nodes (see Annex 2).

Figure 13:
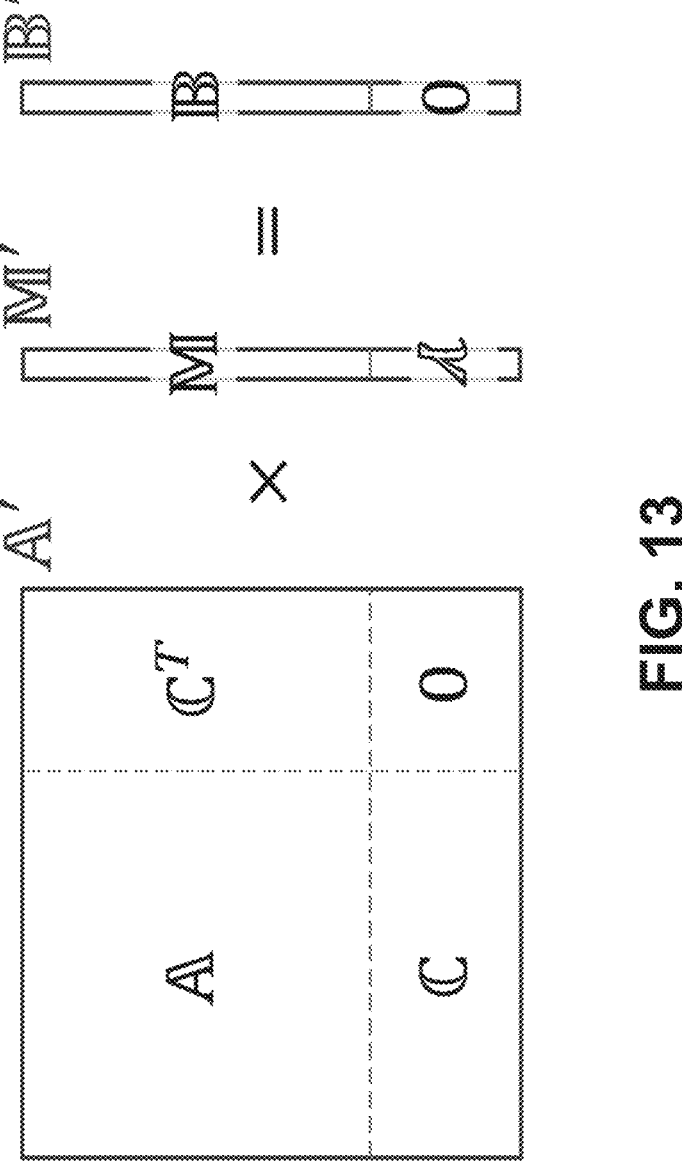
FIG. 13 shown that the set of continuity constraints can be gathered into a matrixial system.

A simpler solution (see Annex 3) can lead to a simpler implementation. This can result in solving an extended system $\mathbb{A}'\mathbb{M}'=\mathbb{B}'$:

The set of continuity constraints can be gathered into a Matrix "C" as shown in FIG. 13 where C describes the set of continuity constraints to apply on slave nodes.

Embodiments described herein can involve constraining deformation to be small.

Introducing, a constraint on motion of the control points to be close to the mean of the control points for all finite elements provides a new shape for the matrix (see Annex 4 for details).

$$\sum_{e \in S(n)} p_e \left[ \begin{pmatrix} \lambda \cdot C & 0 \\ 0 & \lambda \cdot C \end{pmatrix} \begin{pmatrix} u_n \\ v_n \end{pmatrix} + \sum_{k \in V(e)} \begin{pmatrix} G_{x,x}^{k,n} - \lambda & G_{x,y}^{k,n} \\ G_{x,y}^{k,n} & G_{y,y}^{k,n} - \lambda \end{pmatrix} \begin{pmatrix} u_k \\ v_k \end{pmatrix} \right] =$$

$$-\sum_{e \in S(n)} p_e \begin{pmatrix} F_x^n \\ F_y^n \end{pmatrix}$$

$$\text{where } G_{x,y}^{k,n} = \sum_{r \in e} \varphi_{k_e}(r) \varphi_{n_e}(r) \nabla_x(r) \nabla_y(r)$$

and c is the number of nodes per finite elements. Here it is C=4 control points for the bilinear model. The $\lambda$ parameter controls the strength of the constraint.

To avoid instabilities in the resolution, constraints can force $$\lambda > \min_{e,n,x,y} \left( \Sigma_{k \in V(e)} G_{x,x}^{k,n}, \Sigma_{k \in V(e)} G_{y,y}^{k,n} \right).$$

The $\mathbb{A}$ Matrix remains symmetric and sparse. This deformation constraint can be applied only if of interest.

When using three control points, the previous formulas remain valid. Of course, $\varphi$ functions must be defined accordingly (e.g. affine instead of bilinear).

If we want to introduce an additional continuity constraint on the free (down right) corner of each finite element (see Annex 5). The constraint to apply per element e is:

$$M_{0_{e\_bottom\_right}} = M_{1_e} + M_{2_e} - M_{0_e}$$

Then the system $\mathbb{A}'\mathbb{M}'=\mathbb{B}'$ can be solve, as described in Annex 3, with $\mathbb{C}$ describing the aforementioned set of constraints.

FIG. 13 shows an example diagram of the extended system $\mathbb{A}'\mathbb{M}'=\mathbb{B}'$. In this example, $\mathbb{C}$ describes the set of continuity constraints to apply on slave nodes. The intermediate $\lambda$ values can be ignored when extracting the $\mathbb{M}$ part of the solution. In the same manner, according to some embodiments, constrained motion vectors (slave nodes) can be readjusted from unconstrained motion vectors (master nodes) for accuracy reasons. It is not mandatory for all embodiments, but can be done for accuracy reasons.

Not-Fully Connected Mesh

Embodiments described herein can relate to non-fully connected mesh. Even if the not-fully connected mesh does not produce a pure smooth motion, it introduces a suitable level of continuity in the motion field. It is applicable if the degree of freedom of the motion model for the elements is lower than the number of nodes. As a first example, a bilinear motion model (4 parameters) with rectangles (4 nodes) can provide a fully connected mesh. As another example, an Affine model (2 or 3 parameters) with rectangles (4 nodes) can provide a non-fully connected mesh. This can be applicable to VVC.

Figure 14:
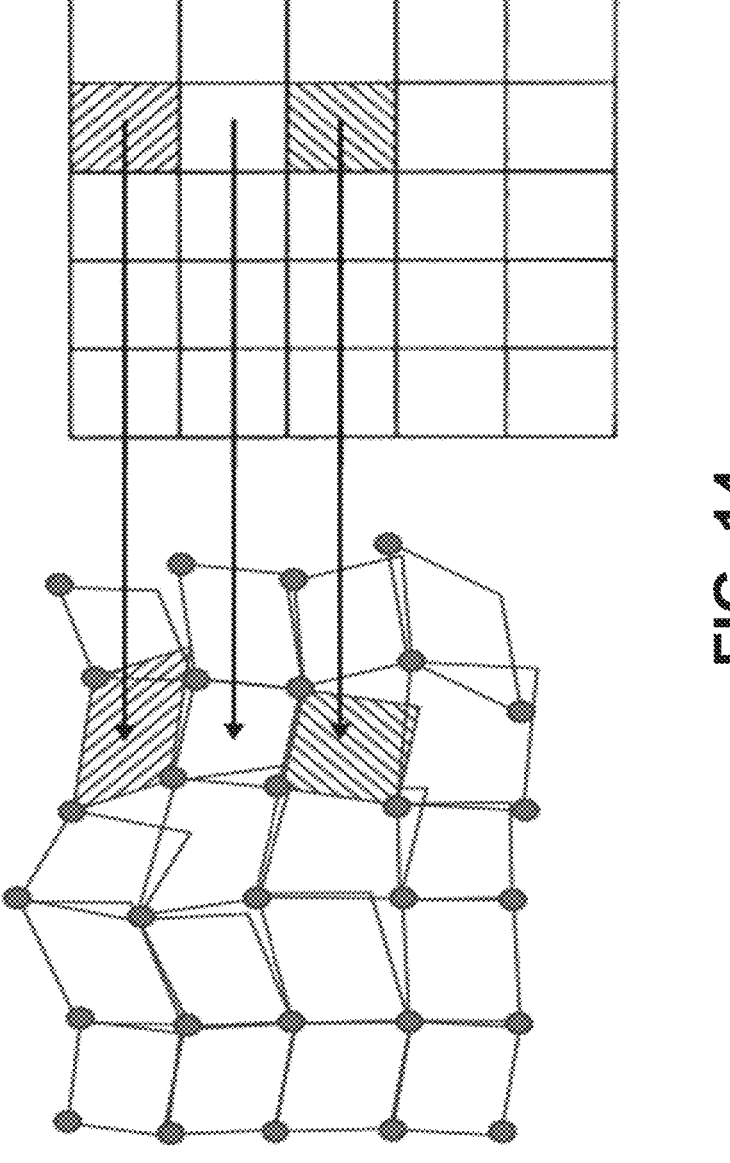
FIG. 14 is an example diagram of non-fully connected mesh.

FIG. 14 is an example diagram of non-fully connected mesh.

In this example, interpolation $\varphi$ functions are affine (previously bilinear). Compared to the bilinear case, the support S(n) is reduced and the considered vertices k also.

Figure 15:
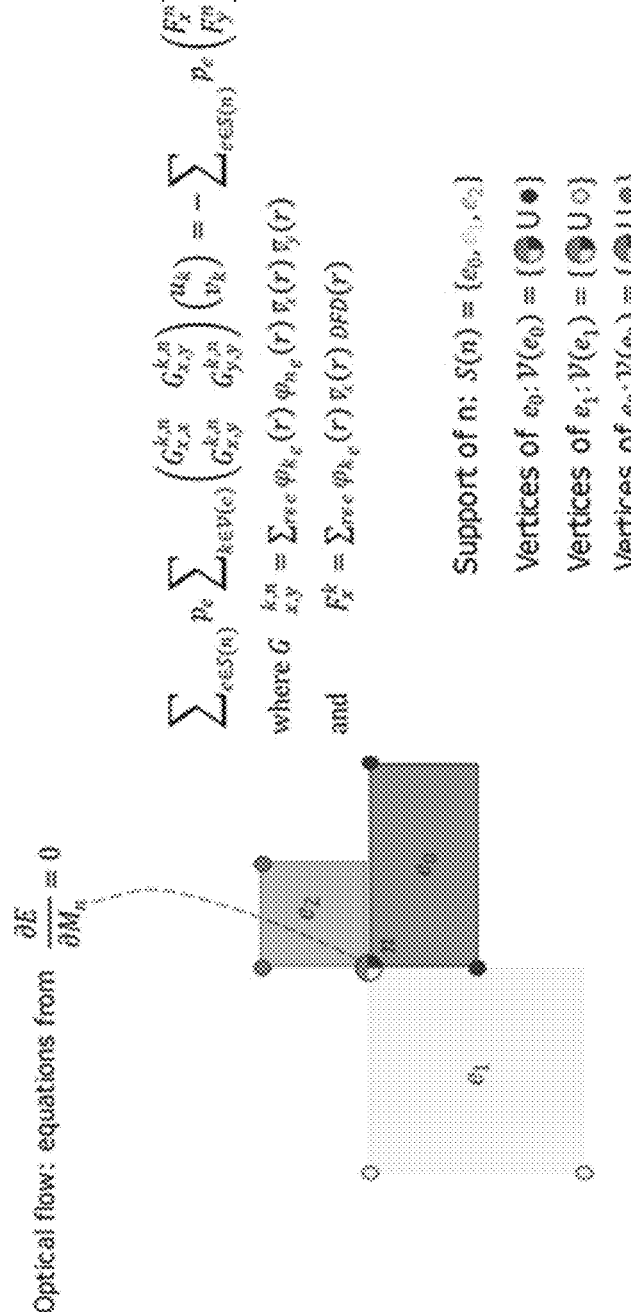
FIG. 15 is a diagram of example equations for optical flow that are modified to be applicable to versatile video coding (3 control points case in VVC)

FIG. 15 is a diagram of example equations for optical flow that are modified to be applicable to versatile video coding (VVC).

Embodiments described herein relate to memory storing machine executable instructions that when executed by a hardware processor implement two parts for probabilistic mesh motion estimation. The first part fills the matrix A. The second part is the resolution of AX=B (whether A is constrained or not).

Embodiments described herein relate to the introduction of the INTER probability in the model (for appearing areas in the video).

Embodiments described herein relate to the use of master and slave nodes and over splitting for mesh continuity preservation.

Embodiments described herein relate to non fully connected mesh: applicable to VVC and other video coding standards. The trend of motion estimation is moving toward more and more complex models, so this may be followed for VVC (the new codec from MPEG). Embodiments described herein provide mesh motion estimation using one or more implementations to solve the problem known as the aperture problem.

Embodiments described herein apply to different use cases of encoder (or transcoder) utilization.

Figure 16:
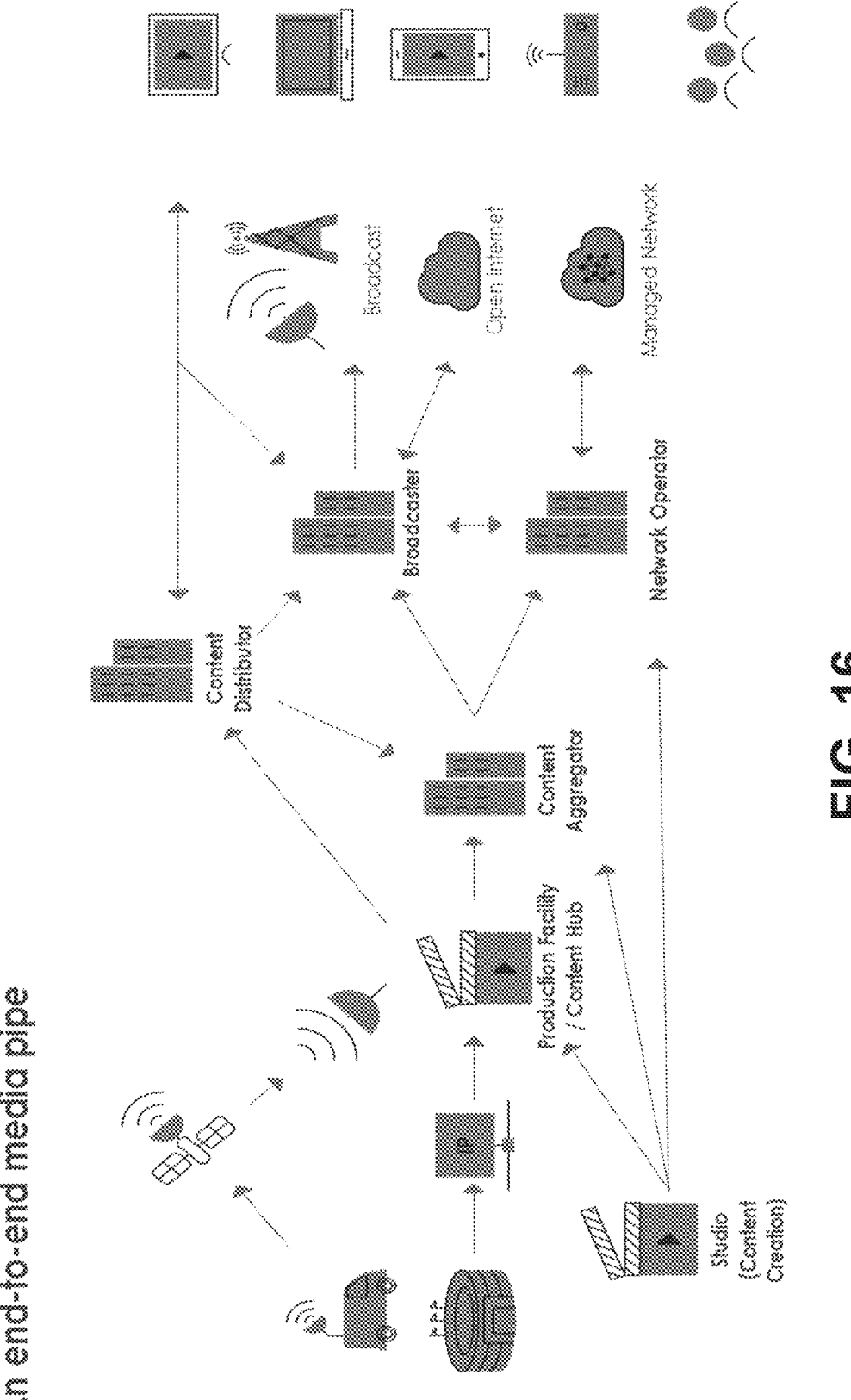
FIG. 16 is a diagram of an example end to end media system.

Embodiments described herein relate to encoding live media content. FIG. 16 is a diagram of an example end to end media system. The media pipe involves content creation and production. A content distributor provides the content to a content aggregator, which in turn provides aggregated content to a broadcaster or network operator. The content is delivered to end devices by broadcast equipment, the Internet, or a managed network.

The media or video content can be delivered using appliances (e.g. software and hardware bundled), cloud native applications (e.g. software for on-premises or public cloud infrastructure), as a service (e.g. cloud native application and public cloud infrastructure and services).

Figure 17:
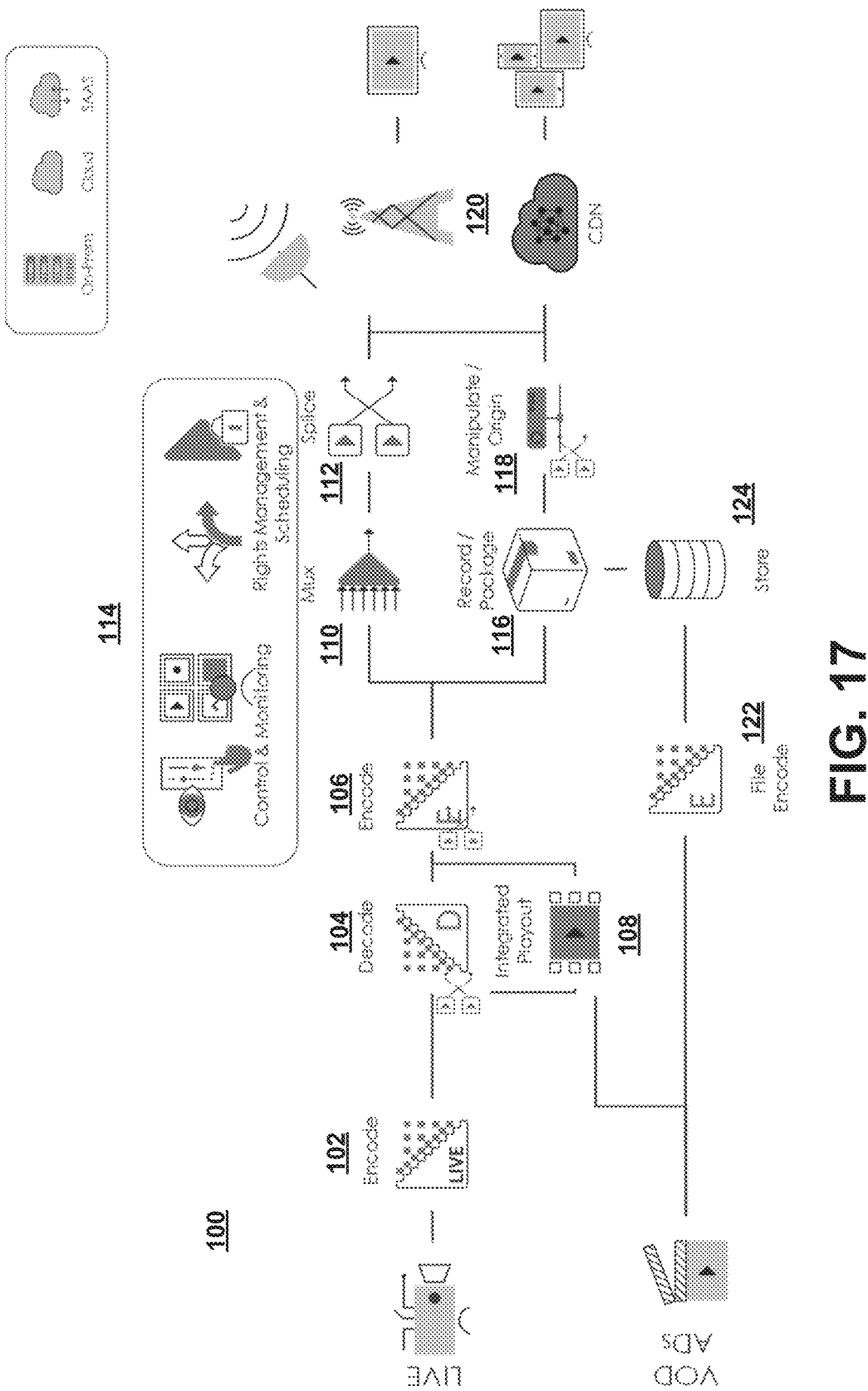
FIG. 17 is a diagram of an example system for video distribution over internet mobile and satellite. Motion estimations (including mesh motion estimations) can be done in encoders, and video distribution systems can include encoders.

FIG. 17 is a diagram of an example system 100 for video distribution over internet mobile and satellite. Components of the system 100 can utilize probabilistic MME. For example, encoders can implemented motion estimations (including MME). Video distribution systems, such as system 100, can include encoders. The system 100 can involve streaming live media content, or an appliance device for video-on-demand (VOD) media content. An encoder 102 can encode the live media content. A decoder 104 can decode the (encoded) media content. In some embodiments, the encoded (live) media content can be integrated or aggregated with VOD content by integrated playout 108. An encoder 106 can encode the integrated content for provision to a multiplexer 110 and splicer 112. There can be a record and package 116 of the content, and devices to manipulate 118 the content. In some embodiments, an encode file device 122 can transform the VOD content into an encoded file and which is then stored in a data store 124. The system 100 can involve different devices for content delivery 120 such as a content delivery network or broadcasting equipment. There can be different types of end devices for playback of the media content. The system 100 can deliver content by appliances, cloud applications and/or software as a service infrastructure.

Figure 18:
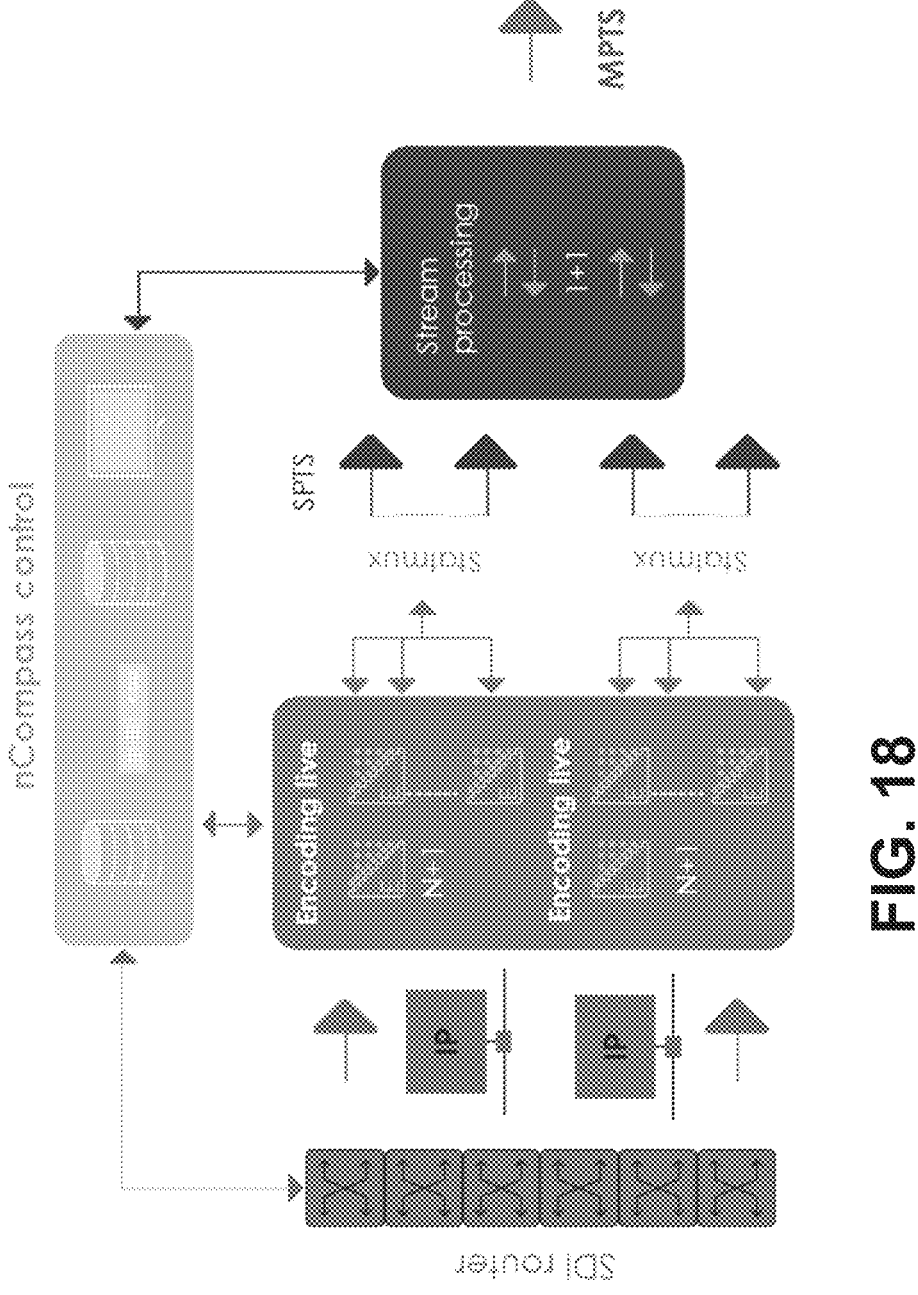
FIG. 18 is a diagram of an example appliance where the probabilistic mesh motion estimation can be utilized.

FIG. 18 is a diagram of an example appliance 200 where probabilistic mesh motion estimation can be utilized. The appliance 200 has an SDI router, IP input/output, one or more encoders, and one or more statistical multiplexers that generate single program transport streams (SPTS). The appliance 200 has a stream processing device to generate a multiple program transport stream from the SPTS. The appliance 200 has a control system, such as a proportional-integral-derivative (PID) controller to manage content processing by the appliance 200.

Figure 19:
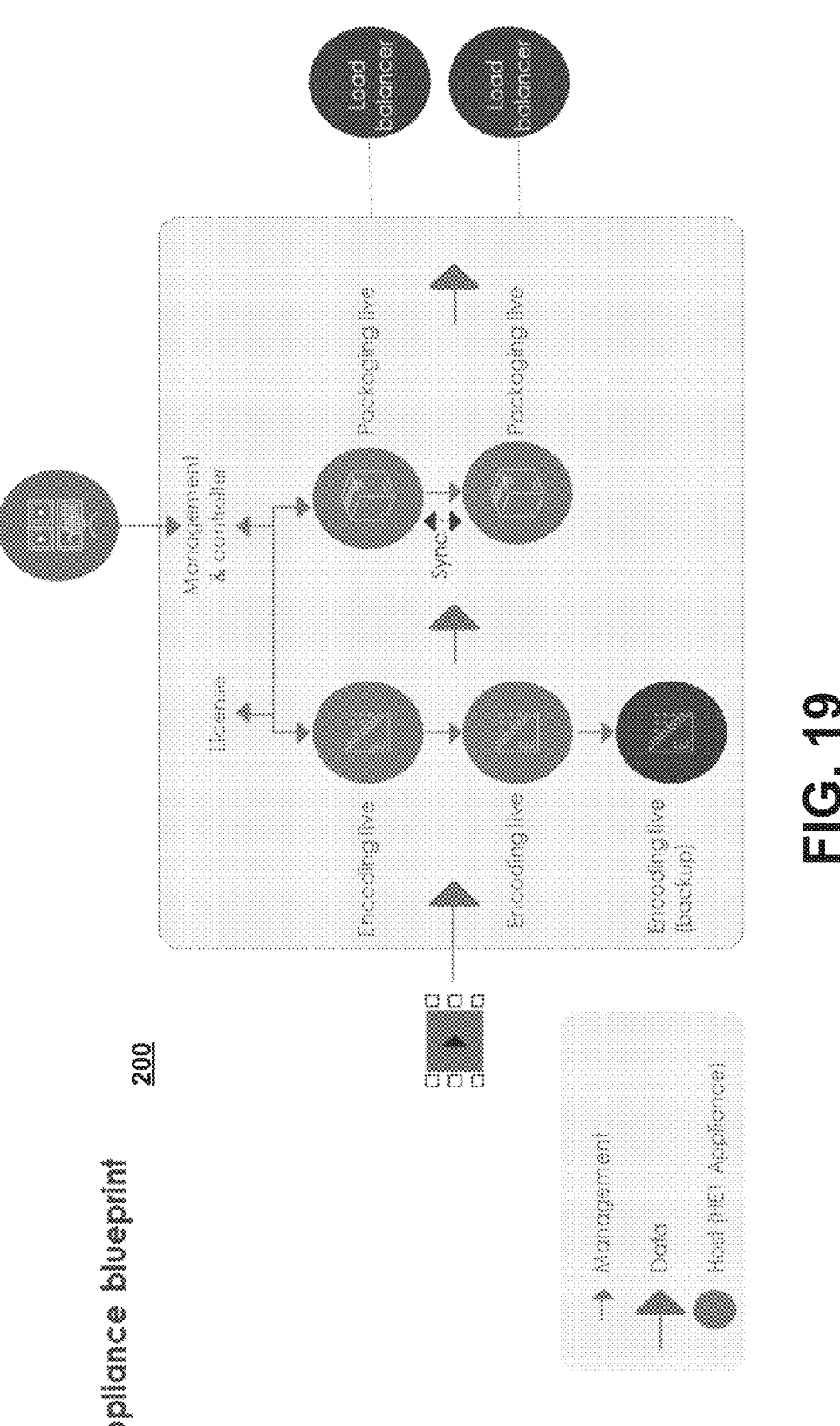
FIG. 19 is another diagram of an example appliance where probabilistic mesh motion estimation can be utilized.

FIG. 19 is another diagram of an example appliance 200 where probabilistic mesh motion estimation can be utilized. The appliance 200 has one or more encoders for encoding live, and one or more packagers for packaging live. There can backup encoders. The one or more packagers can sync content. The appliance 200 can have one or more load balancers for output. The appliance 200 can have a management and control system. This example diagram shows the management flow and data flow for the appliance 200.

Figure 20:
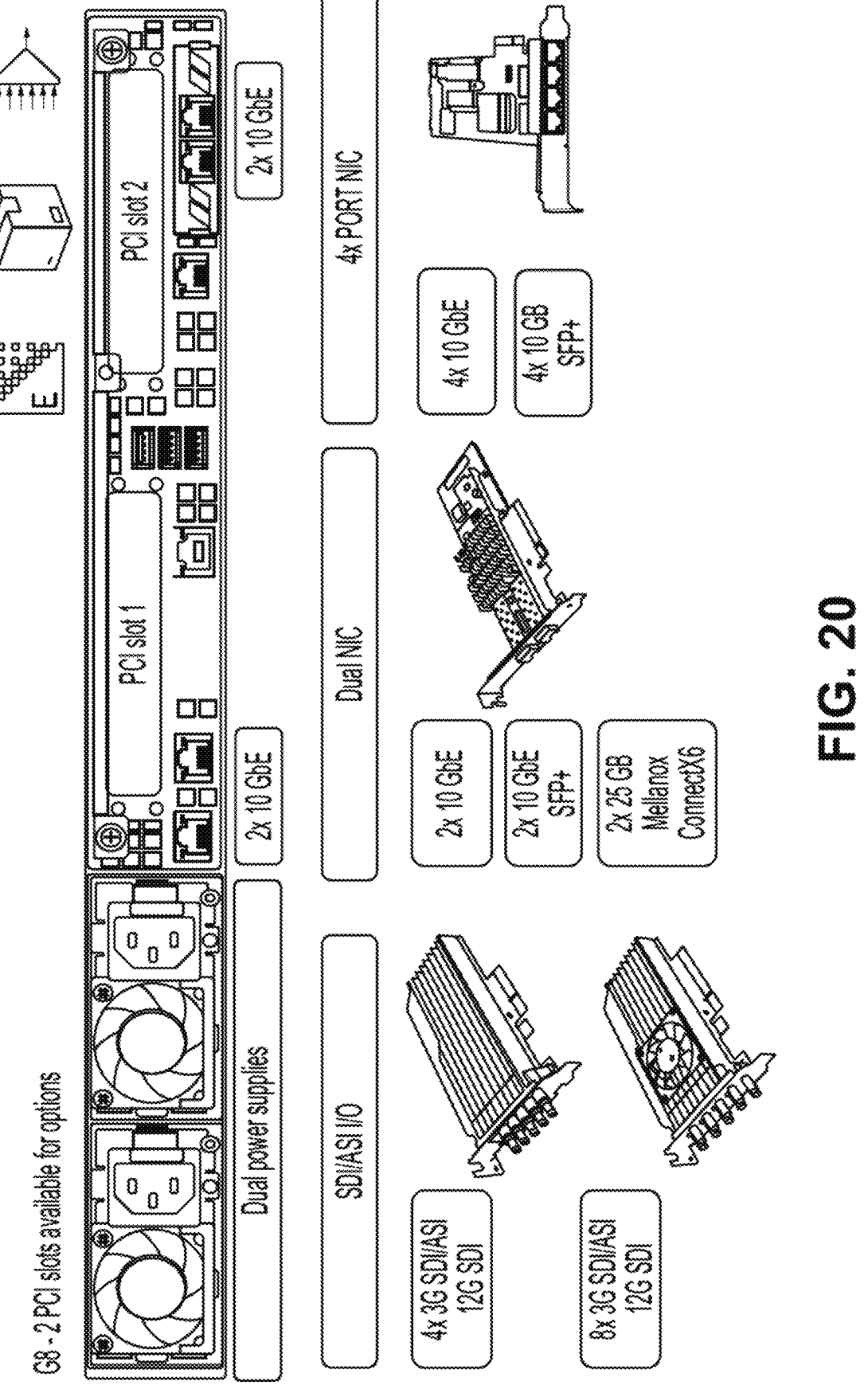
FIG. 20 is a diagram of example hardware components for an example appliance where the probabilistic mesh motion estimation can be utilized.

FIG. 20 is a diagram of example hardware components for an example appliance 200. As shown, Peripheral Component Interconnect (PCI) slots can connect various hardware to the appliance 200.

Figure 21:
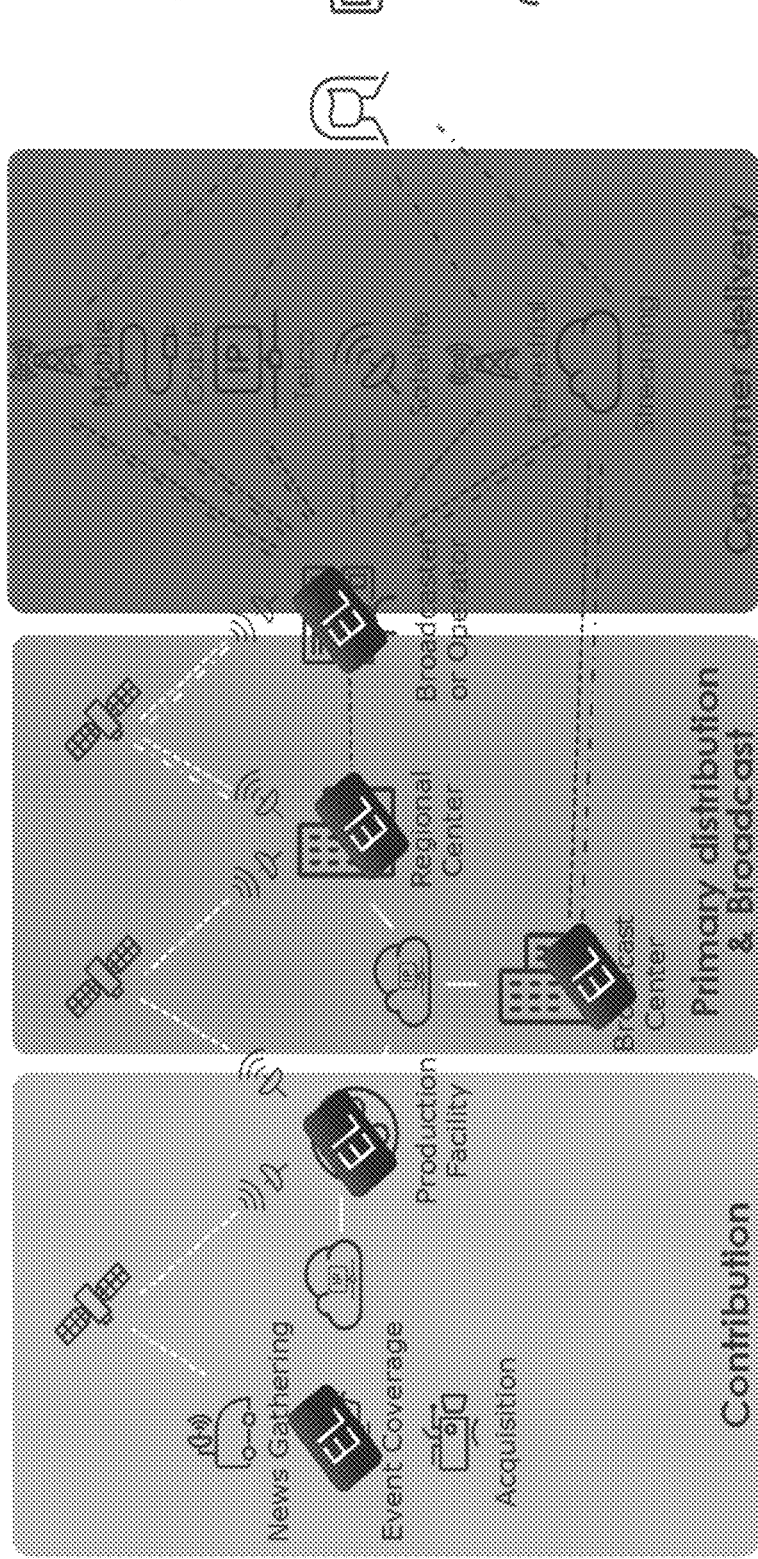
FIG. 21 is a diagram of a high level ecosystem chain presentation with different encoders or encoding live (EL) components.

FIG. 21 is a diagram of a high level ecosystem chain presentation. The diagram shows different encoders or encoding live (EL) components. The diagram shows the "contribution part" of the chain, and what is the "distribution part" of the delivery chain. The encoders can implement probabilistic mesh motion estimation according to embodiments described herein.

Accordingly, embodiments described herein can be implemented as part of one or more encoders or one or more transcoders.

Figure 22:
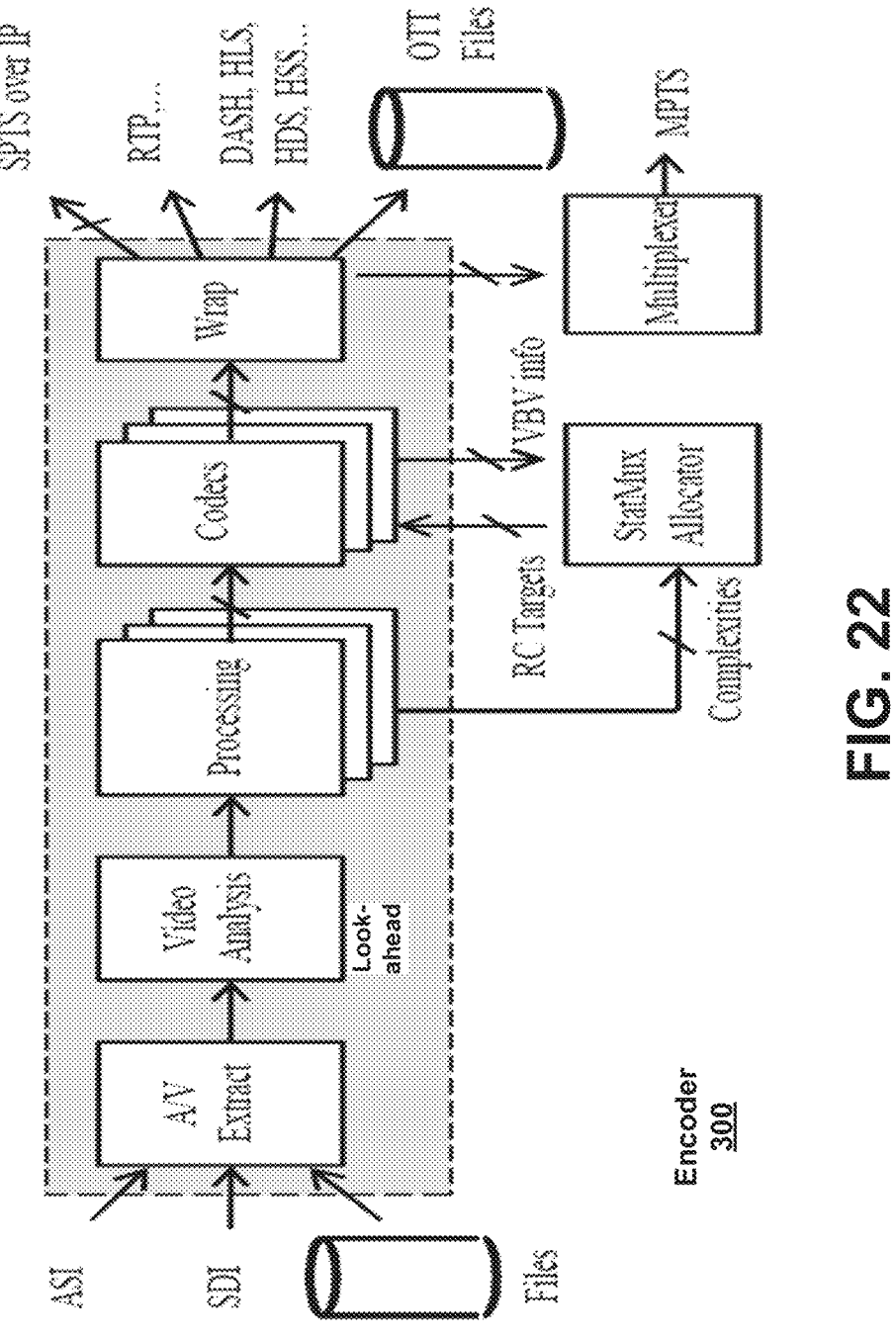
FIG. 22 is a diagram of an example encoder that can implement probabilistic mesh motion estimation.

FIG. 22 is a diagram of an example encoder 300 that can implement probabilistic mesh motion estimation according to embodiments described herein. The look-ahead is a component in the architecture of an encoder 300. For encoding live content data and encoding on-demand content data, several motion estimation operations can be performed in the look-ahead or in the codec of the encoder 300. In accordance with embodiments described herein, MME can be used for video compression and applied in the look-ahead of the encoder 300. In an encoder 300, the look-ahead (also be referred to as video analysis block) stores several frames of video. The look-ahead of the encoder 300 computes video complexity of images, detects sequence transitions (cuts, fade, dissolves, etc.), and can perform motion estimation to provide vector fields that will be beneficial for various encoding formats including MPEG-2, H.264/MPEG-4 AVC and High Efficiency Video Coding (HEVC). Codecs are compression cores scalable to the number of profiles, resolutions and encoding formats. Further details are provided in "High Efficiency Video Coding (HEVC): replacing or complementing existing compression standards?" by Michael Ropert, et al. 2013 https://www.researchgate.net/publication/261449157_High_efficiency_video_coding_HEVC_Replacing_or_complementing_existing_compression_standards, the entire contents of which is hereby incorporated by reference. The mesh structure for motion estimation is generally based on the same concept as the partitioning that is used in codecs, e.g., rectangles with various sizes and various connectivity since HEVC.

Figure 23:
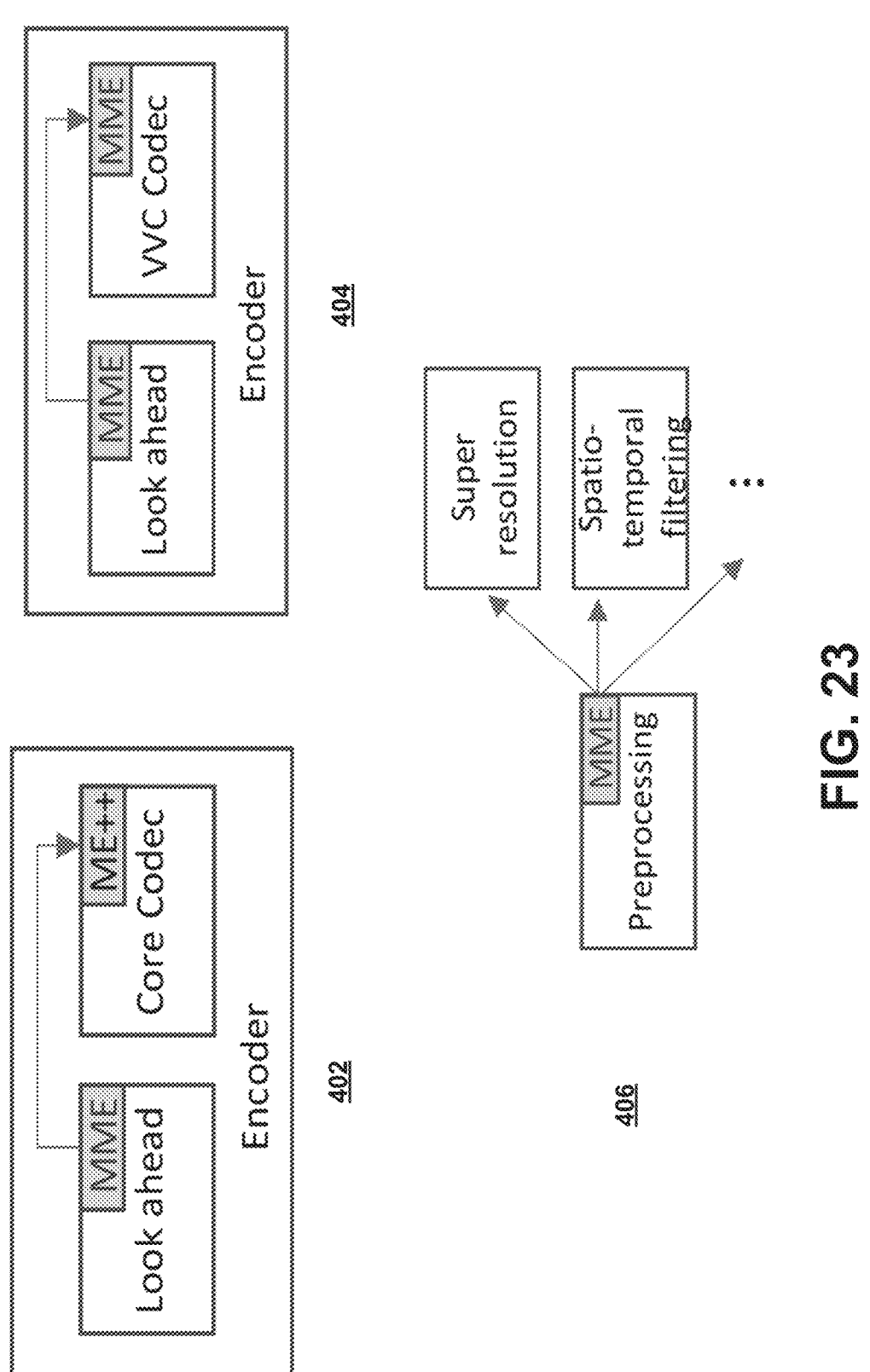
FIG. 23 shows different example applications for encoding or processing where probabilistic mesh motion estimation can be utilized.

FIG. 23 shows different example applications for encoding or processing where probabilistic mesh motion estimation can be utilized according to embodiments described herein. Motion is what makes a different between image coding and video coding.

For example, an encoder 402 can use probabilistic mesh motion estimation in the look-ahead or pre-processing module. As another example, an encoder 404 can use probabilistic mesh motion estimation in two locations: in the look-ahead and the core codec. As a further example, an encoder 406 can use probabilistic mesh motion estimation for pre-processing techniques for catching true motion, such as before super resolution operations or spatial-temporal filtering operations. As an additional example, an encoder can use probabilistic mesh motion estimation for temporal interpolation (e.g. 25 hz to 40 Hz, slow motion video creation). As another example, an encoder can use probabilistic mesh motion estimation for object tracking. These are illustrative examples and there are other applications for probabilistic mesh motion estimation according to embodiments described herein.

Figure 25:
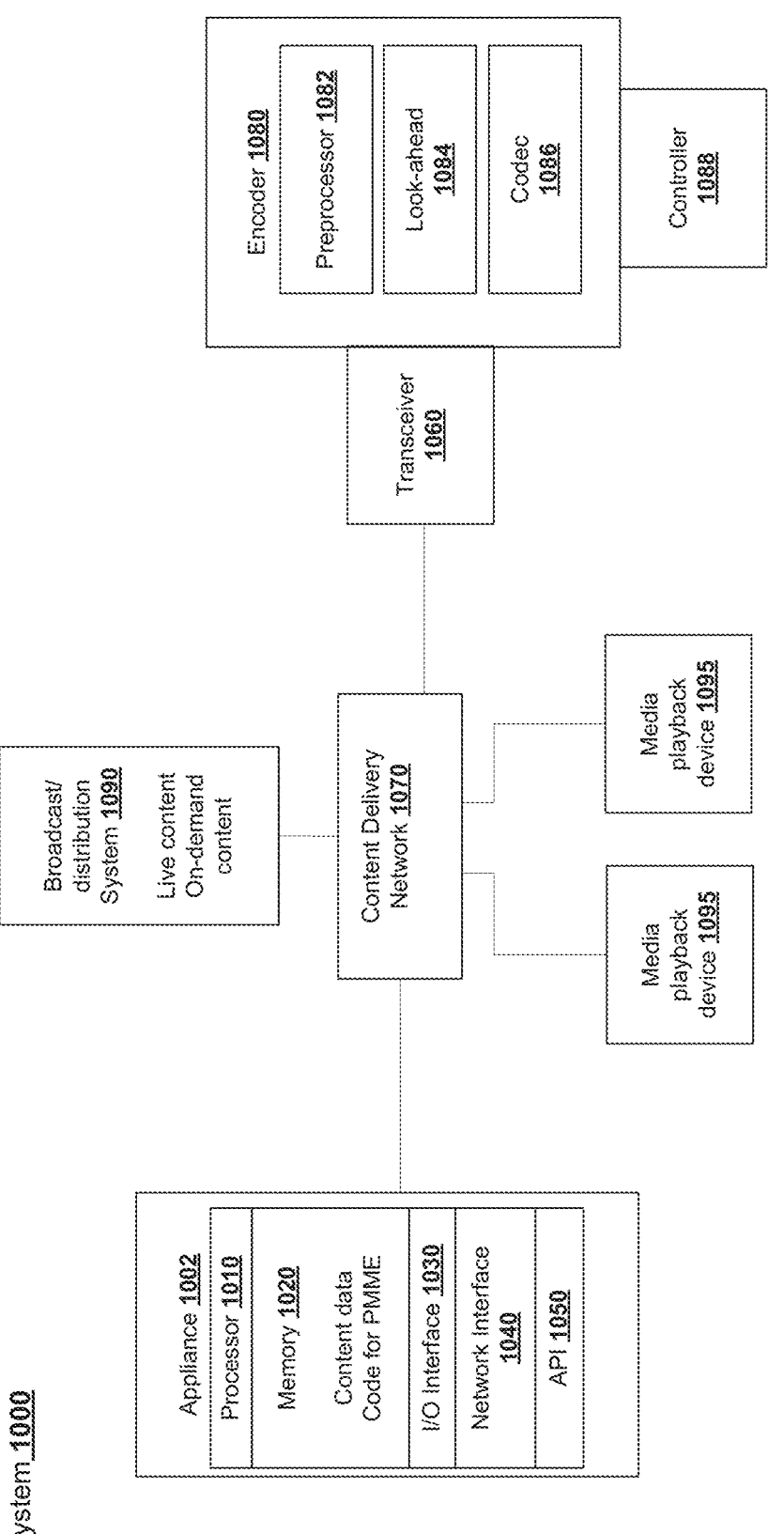
FIG. 25 is a diagram of an example system with components that can use probabilistic mesh motion estimation.

FIG. 25 is a high-level schematic diagram of a content system 1000 with components that can use probabilistic mesh motion estimation. For example, encoder 1080 can implement probabilistic mesh motion estimation. Content system 1000 may operate as part of an over-the-top (OTT) media service that delivers content to end users at media playback device 1095. The content may include, for example, audio and/or video content.

Content system 1000 uses encoder 1080 or appliance 1002 for processing content using PMME. For example, encoder 1080 can have a preprocessor 1082, a look-ahead 1084, and a codec 1086. For simplicity only, one encoder 1080 is shown but system 1000 may include multiple encoders 1080. The encoders 1080 may be the same or different types of devices. The encoder 1080 may be connected in various ways including directly coupled, indirectly coupled via a network, and distributed over a wide geographic area and connected via a network.

As shown, content system 1000 has at least one processor 1010 and memory 1020 in communication with the at least one processor 1010. For example, the content system 100 can have an appliance device 1002 that utilizes PMME. The applicant device 1002 can have at least one processor 1010 and memory 1020. The memory 1020 stores software code, which when executed by the at least one processor 1010 causes the processor 1010 to process video data to estimate motion in one or more locations of the video data using PMME based on a motion model. In some embodiments, the memory 1010 stores the video data.

In some embodiments, the processor 1010 introduces inter-probability in the motion model for appearing areas in the video data in conjunction with using the probabilistic mesh motion estimation. In some embodiments, the processor 1010 introduces a probability that regions in the video data are intra-regions or inter-regions in the motion model as weights to indicate a confidence of finite elements being inter-associated. In some embodiments, the processor 1010 uses master and slave nodes and over-splitting for mesh continuity preservation. In some embodiments, the processor 1010 implements dedicated splitting for motion continuity preservation.

As another example, content system 1000 can have another hardware device that utilizes PMME for different use cases, and that device can have at least one processor and memory. In some embodiments, the content system 1000 has a transceiver for receiving and transmitting the video data.

As a further example, the content system 1000 can have an encoder 1080 that utilizes PMME. The encoder 1080 can have a preprocessor 1082, a look-ahead 1084, and a codec 1086. In some embodiments, the encoder 1080 uses probabilistic mesh motion estimation for compression of the video data. In some embodiments, the look-ahead 1084 implements PMME. In some embodiments, the codec 1086 implements PMME. In some embodiments, the preprocessor 1082 implements PMME.

In some embodiments, the encoder 1080 introduces inter-probability in the motion model for appearing areas in the video data in conjunction with using the PMME. In some embodiments, the encoder 1080 introduces a probability that regions in the video data are intra-regions or inter-regions in the motion model as weights to indicate a confidence of finite elements being inter-associated. In some embodiments, the encoder 1080 uses master and slave nodes and over-splitting for mesh continuity preservation. In some embodiments, the encoder 1080 uses a non fully connected mesh applicable to video coding standards for compression and preprocessing. In some embodiments, the encoder 1080 implements dedicated splitting for motion continuity preservation.

Content system 1000 provides certain technical advantages using PMME. Content system 1000 includes a broadcast/distribution system 1090 for live content and/or on-demand content, content delivery network 1070, and a plurality of media playback devices 1095. Each media playback device 1095 is a device operable by an end user to play video content.

Broadcast/distribution system 1090 may serve as a content origin server for an OTT media service. Content system 1000 delivers live content and/or on-demand content to media playback devices 1095 by way of content delivery network 1070. Content delivery network 1070 includes a distributed network of proxy servers and data caches interconnected by way of a communication network.

Content delivery network 1070 includes a communication network and a distributed plurality of proxy servers and data caches. Communication network may include a packet-switched network portion, a circuit-switched network portion, or a combination thereof. Communication network may include wired links, wireless links such as radio-frequency links or satellite links, or a combination thereof. Communication network may include wired access points and wireless access points. Portions of communication network 135 could be, for example, an IPv4, IPv6, X.25, IPX or similar network. Portions of communication network could be, for example, a GSM, GPRS, 3G, LTE or similar wireless networks. communication network 135 may include or be connected to the Internet. When communication network 135 is a public network such as the public Internet, it may be secured as a virtual private network. Communication network can be adapted for transmission of ABR streams over HTTP.

Broadcast/distribution system 1090 receives primary content from one or more content sources. Broadcast/distribution system 1090 receives content segments and transmits content via content delivery network 1070. Broadcast/distribution system 1090 can serve as a multicast server and can include one or more gateways. Broadcast/distribution system 1090 can broadcast content to gateways that have joined its multicast stream. The multicasting may be by way of a communication network. Although one broadcast/distribution system 1090 is depicted, in some embodiments, content system 1000 may include a plurality of broadcast/distribution systems 1090. Each broadcast/distribution system 1090 may be dedicated to particular content, e.g., live content, on demand content, a particular broadcast, channel, or program, or portions of the foregoing.

Broadcast/distribution system 1090 can have one or more gateways, such as a residential gateway that connects a local area network (LAN) to a wide area network (WAN). In some embodiments, gateway is a residential gateway adapted with custom software code to perform the functions disclosed herein. The custom software may be provided to existing device in the home, e.g., by way of a software update, to perform the functions disclosed herein. In some embodiments, gateway may, for example, be a router, switch, hub, set-top box or other device that provides connection between a LAN and a WAN.

Each media playback devices 1095 is a device operable by an end user to play streamed content. For example, a media playback device 1095 may be a digital media player, a set-top box, a video game console, each connected to a display device for playing streamed content. A media playback device 1095 may also be smart television device or a personal computing device such as a laptop computer, a tablet computer or a smartphone, each having an integrated display screen for playing streamed content. A media playback device 1095 may be also referred to as a player device herein.

Media playback device 1095 can begin preparing for playout, e.g., by requesting content. A playout request may be responsive to user control of media playback device 1095. The playout request is received at content delivery network 1070, which then requests content from the broadcast/distribution system 1090.

Broadcast/distribution system 1090 transmits content data to content delivery network 1070, e.g. by way of multicast transmission or unicast transmission. The content delivery network 1070 transmit the content data to encoder 1080 or appliance 1002 for processing. Embodiments have been described herein can use different protocols for communication between a broadcast/distribution system 1090 and media device 1095.

Different example hardware components can be used to implement encoder 1080 or appliance 1002. The hardware components may be used to implement various elements of PMME, in accordance with an embodiment.

In one example, a computing device may be used to implement an encoder 1080. In another example, computing device may be used to implement an appliance 1002.

As depicted, appliance 1002 includes at least one processor 1010, memory 1020, at least one I/O interface 1030, and at least one network interface 1040.

Each processor 1010 may be, for example, any type of general-purpose microprocessor or microcontroller, a digital signal processing (DSP) processor, an integrated circuit, a field programmable gate array (FPGA), a reconfigurable processor, a programmable read-only memory (PROM), or any combination thereof.

Memory 1020 may include a suitable combination of any type of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like.

Each I/O interface 1030 enables appliance 1002 to interconnect with one or more input devices, such as a keyboard, mouse, camera, touch screen and a microphone, or with one or more output devices such as a display screen and a speaker.

Each network interface 1040 enables appliance 1002 to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these.

For simplicity only, one appliance 1002 is shown but system 1000 may include multiple appliances 1002. The appliance 1002 may be the same or different types of devices. The appliance 1002 may be connected in various ways including directly coupled, indirectly coupled via a network, and distributed over a wide geographic area and connected via a network.

Figure 26:
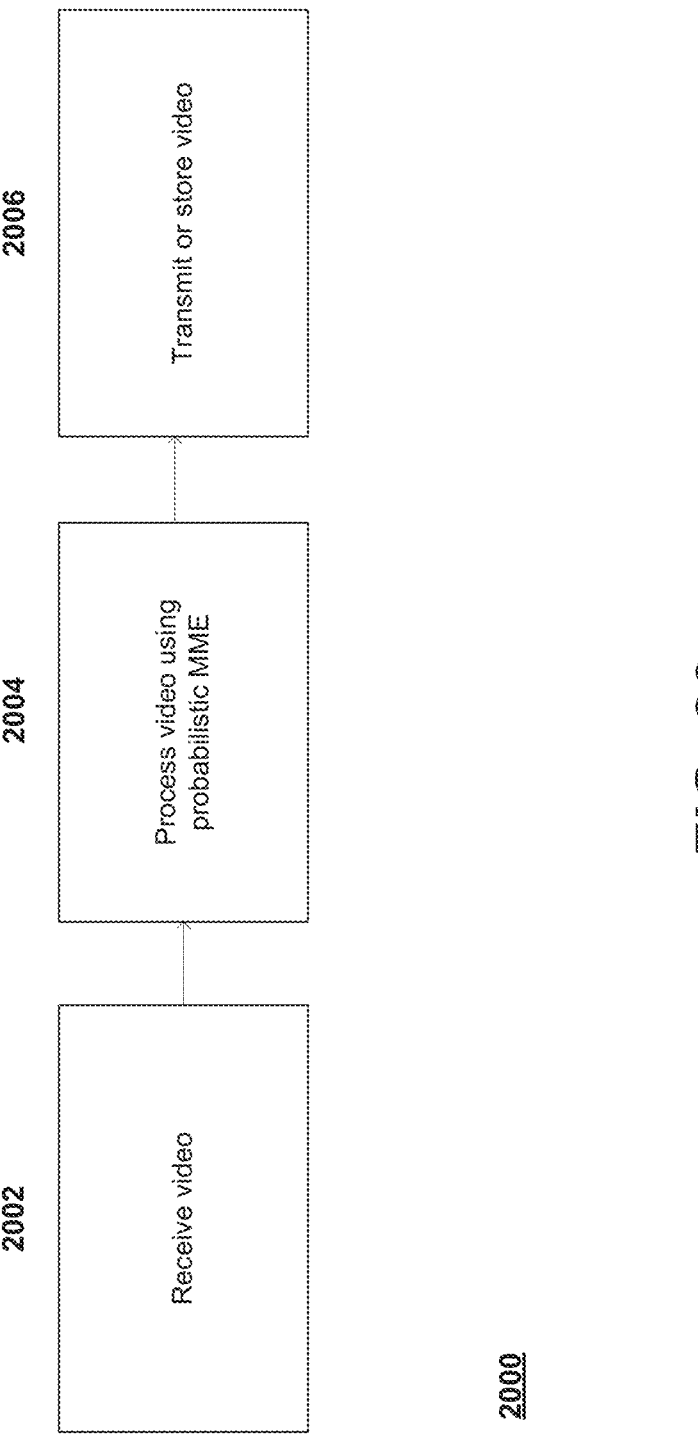
FIG. 26 is a diagram of an example method for probabilistic mesh motion estimation.

FIG. 26 is a diagram of an example method 2000 for probabilistic mesh motion estimation.

At 2002, an encoder (e.g. encoder 1080) or other processing device (e.g. appliance 1002) receives video data. For example, the video data can be live content or on-demand content.

At 2004, the encoder or other processing device processes the video data to estimate motion in one or more locations of the video data using probabilistic mesh motion estimation based on a motion model. The encoder can have a preprocessor, a look-ahead, and a codec. The encoder can use probabilistic mesh motion estimation for compression of the video data, for example. In some embodiments, the look-ahead implements the probabilistic mesh motion estimation. In some embodiments, the codec implements the probabilistic mesh motion estimation. In some embodiments, the preprocessor implements the probabilistic mesh motion estimation. The encoder can introduce inter-probability in the motion model for appearing areas in the video data. The encoder can introduce a probability that regions in the video data are intra-regions or inter-regions in the motion model as weights to indicate a confidence of finite elements being inter-associated. The encoder can use master and slave nodes and over-splitting for mesh continuity preservation. The encoder can use a non-fully connected mesh applicable to video coding standards. The encoder can implement dedicated splitting for motion continuity preservation.

At 2006, the processed video is stored in memory or transmitted to another component or system using a transceiver. In some embodiments, the method 2000 involves encoding (or compressing) video data using the estimated motion.

It should be understood that steps of one or more of the blocks depicted in FIG. 26 may be performed in a different sequence or in an interleaved or iterative manner. Further, variations of the steps, omission or substitution of various steps, or additional steps may be considered.

The foregoing discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Throughout the foregoing discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements.

Of course, the above described embodiments are intended to be illustrative only and in no way limiting. The described embodiments are susceptible to many modifications of form, arrangement of parts, details and order of operation. The In matrixial sense it means $\forall n$, $$\frac{\partial E}{\partial M_n} = \begin{pmatrix} 0 \\ 0 \end{pmatrix}.$$

The few coming lines uses matrixial derivation.

$$\frac{\partial E}{\partial M_n} = \frac{\partial}{\partial M_n} \sum_{e \in \mathcal{D}} p_e \sum_{r \in e} \left( \sum_{k \in V(e)} \varphi_{k_e}(r) \nabla(r)^T \cdot M_{k_e} + FD(r) \right)^2$$

Defining S(n), the set of finite elements having the node numbered n as vertex $$\frac{\partial E}{\partial M_n} = \frac{\partial}{\partial M_n} \sum_{e \in S(n)} p_e \sum_{r \in e} \left( \sum_{k \in V(e)} \varphi_{k_e}(r) \nabla(r)^T \cdot M_{k_e} + FD(r) \right)^2 +$$

$$\underbrace{\frac{\partial}{\partial M_n} \sum_{e \notin S(n)} p_e \sum_{r \in e} \left( \sum_{k \in V(e)} \varphi_{k_e}(r) \nabla(r)^T \cdot M_{k_e} + FD(r) \right)^2}_{=0, because\ k_e \neq n\ for\ e \notin S(n)} =$$

$$\sum_{e \in S(n)} p_e \sum_{r \in e} \frac{\partial}{\partial M_n} \left( \sum_{k \in V(e)} \varphi_{k_e}(r) \nabla(r)^T \cdot M_{k_e} + FD(r) \right)^2 =$$

$$2 \sum_{e \in S(n)} p_e \sum_{r \in e} \left( \left( \frac{\partial}{\partial M_n} \left( \sum_{k \in V(e)} \varphi_{k_e}(r) \nabla(r)^T \cdot M_{k_e} + FD(r) \right) \right) \left( \sum_{k \in V(e)} \varphi_{k_e}(r) \nabla(r)^T \cdot M_{k_e} + \right. \right.$$

$$FD(r) \Big) \Big) = 2 \sum_{e \in S(n)} p_e \sum_{r \in e} \left( (\varphi_{n_e}(r) \nabla(r)) \left( \sum_{k \in V(e)} \varphi_{k_e}(r) \nabla(r)^T \cdot M_{k_e} + FD(r) \right) \right) =$$

$$2 \sum_{e \in S(n)} p_e \sum_{r \in e} \left( \left( \sum_{k \in V(e)} \varphi_{k_e}(r) \varphi_{n_e}(r) \nabla(r) \cdot \nabla(r)^T \cdot M_{k_e} \right) + \varphi_{n_e}(r) \nabla(r) FD(r) \right)$$

disclosure is intended to encompass all such modification within its scope, as defined by the claims.

Annex 1

Optical Flow: Equation Generalization (Intra Probability)

The total square error over the image is with $p_e$=Prob $(e \notin$ INTRA):

$$E = \sum_{e \in \mathcal{D}} p_e E_e = \sum_{e \in \mathcal{D}} p_e \sum_{r \in e} \left( \nabla(r)^T \cdot mv_e(r) + FD(r) \right)^2$$

$$E = \sum_{e \in \mathcal{D}} p_e \sum_{r \in e} \left( \sum_{k \in V(e)} \nabla(r)^T \cdot \varphi_{k_e}(r) \times M_{k_e} + FD(r) \right)^2$$

$$E = \sum_{e \in \mathcal{D}} p_e \sum_{r \in e} \left( \sum_{k \in V(e)} \varphi_{k_e}(r) \nabla(r)^T \cdot M_{k_e} + FD(r) \right)^2$$

With $\mathcal{D}$ the domain defined by the union of all the elements

With V(e) the set of vertices of the finite element e

Solving in matrixial form $$E = \Sigma_{e \in \mathcal{D}} p_e \Sigma_{r \in e} \left( \Sigma_{k \in V(e)} \varphi_{k_e}(r) \nabla(r)^T \cdot M_{k_e} + FD(r) \right)^2$$

A condition for minimizing is given by null derivatives for all motion vector control points components:

$$\forall n, \frac{\partial E}{\partial u_n} = \frac{\partial E}{\partial v_n} = 0.$$

Then $$\frac{\partial E}{\partial M_n} = 0$$

is equivalent to $$\sum_{e \in S(n)} p_e \sum_{k \in V(e)} \sum_{r \in e} \varphi_{k_e}(r) \varphi_{n_e}(r) \nabla(r) \cdot \nabla(r)^T \cdot M_{k_e} =$$

$$-\sum_{e \in S(n)} p_e \sum_{r \in e} \varphi_{n_e}(r) \nabla(r) FD(r)$$

It can be rewritten for a better readability as:

$$\sum_{e \in S(n)} p_e \sum_{k \in V(e)} \begin{pmatrix} G_{x,x}^{k,n} & G_{x,y}^{k,n} \\ G_{x,y}^{k,n} & G_{y,y}^{k,n} \end{pmatrix} \begin{pmatrix} u_k \\ v_k \end{pmatrix} = -\sum_{e \in S(n)} p_e \begin{pmatrix} F_x^n \\ F_y^n \end{pmatrix}$$

$$\text{where } G_{x,y}^{k,n} = \sum_{r \in e} \varphi_{k_e}(r) \varphi_{n_e}(r) \nabla_x(r) \nabla_y(r)$$

$$\text{and } F_x^k = \sum_{r \in e} \varphi_{k_e}(r) \nabla_x(r) FD(r)$$

Rewriting all the problem in a matrixial form:

$$\mathbb{M}^* = \min_{\mathbb{M}} E$$

It is equivalent to solve $\mathbb{A} \mathbb{M} = \mathbb{B}$

FIG. 24 shows an equivalent system (note: A is symmetric)

where the sub-bloc 2×2

In matrixial sense it means $\forall n$, $$\mathbb{A}_{ij} = \sum_{e \in S(i)} p_e \sum_{k \in V(e)} \delta_{k,j} \sum_{r \in e} \varphi_{i_e}(r)\varphi_{k_e}(r)\nabla(r) \cdot \nabla(r)^T$$

And the sub vector 2×1

$$\frac{\partial E}{\partial M_n} = \begin{pmatrix} 0 \\ 0 \end{pmatrix}.$$

$$\mathbb{B}_i = -\sum_{e \in S(i)} p_e \sum_{r \in e} \varphi_{i_e}(r)\nabla(r)FD(r)$$

The few coming lines uses matrixial derivation. Note that the node n is a master node.

Annex 2

Optical Flow: Equation Generalization with Slaves+Intra Probability, with Constraints Directly Introduced Solving in matrixial form $$\frac{\partial E}{\partial M_n} = \frac{\partial}{\partial M_n}\sum_{e \in D} p_e \sum_{r \in e}\left(\sum_{k \in V(e)}\varphi_{k_e}(r)\nabla(r)^T \cdot M_{k_e} + FD(r)\right)^2$$

$$E = \sum_{e \in D} p_e \sum_{r \in e}\left(\sum_{k \in V(e)}\varphi_{k_e}(r)\nabla(r)^T \cdot M_{k_e} + FD(r)\right)^2$$

We define:

S(n), the set of finite elements having the node numbered n as vertex

Index of master nodes j are noted $\bar{j}$, and index of slave nodes i are noted $\underline{i}$. With this notation: $S(\bar{n}) \cap \mathcal{L}(\bar{n})\mathcal{L}\emptyset$, A condition for minimizing is given by null derivatives for all master motion vector control points components:

$$M_{\underline{k}} = \frac{M_{j_0(\underline{k})} + M_{j_1(\underline{k})}}{2}$$

$$\forall \, n, \frac{\partial E}{\partial u_n} = \frac{\partial E}{\partial v_n} = 0.$$

We can find a combination of motion vectors including $\bar{j}$ in $\mathcal{L}(\bar{n})$, such that:

$$M_{\underline{k}} = a_{\bar{n}}(\underline{k})M_{\bar{n}} + (1 - a_{\bar{n}})M_{\bar{J}(\underline{k})}\frac{\partial E}{\partial M_{\bar{n}}} =$$

$$\frac{\partial}{\partial M_{\bar{n}}}\sum_{e \in S(\bar{n})} p_e \sum_{r \in e}\left(\sum_{k \in V(e)}\varphi_{k_e}(r)\nabla(r)^T \cdot M_{k_e} + FD(r)\right)^2 + \frac{\partial}{\partial M_{\bar{n}}}\sum_{e \notin S(\bar{n})} p_e \sum_{r \in e}\left(\sum_{k \in V(e)}\varphi_{k_e}(r)\nabla(r)^T \cdot M_{k_e} + FD(r)\right)^2 \frac{\partial E}{\partial M_{\bar{n}}} =$$

$$\frac{\partial}{\partial M_{\bar{n}}}\sum_{e \in S(\bar{n})} p_e \sum_{r \in e}\left(\sum_{k \in V(e)}\varphi_{k_e}(r)\nabla(r)^T \cdot M_{k_e} + FD(r)\right)^2 + \frac{\partial}{\partial M_{\bar{n}}}\sum_{\substack{e \notin S(\bar{n}) \\ e \in \mathcal{L}(\bar{n})}} p_e \sum_{r \in e}\left(\sum_{k \in V(e)}\varphi_{k_e}(r)\nabla(r)^T \cdot M_{k_e} + FD(r)\right)^2 +$$

$$\underbrace{\frac{\partial}{\partial M_{\bar{n}}}\sum_{\substack{e \notin S(\bar{n}) \\ e \notin \mathcal{L}(\bar{n})}} p_e \sum_{r \in e}\left(\sum_{k \in V(e)}\varphi_{k_e}(r)\nabla(r)^T \cdot M_{k_e} + FD(r)\right)^2}_{=0, because \, k_e \neq n \, for \, e \notin S(n), e \notin \mathcal{L}(n)} \text{ as } S(\bar{n}) \cap \mathcal{L}(\bar{n}) = \emptyset, \begin{array}{l} e \notin S(\bar{n}) \\ e \in \mathcal{L}(\bar{n}) \end{array} \Leftrightarrow e \in \mathcal{L}(\bar{n}) =$$

$$\sum_{e \in S(\bar{n})} p_e \sum_{r \in e}\frac{\partial}{\partial M_{\bar{n}}}\left(\sum_{k \in V(e)}\varphi_{k_e}(r)\nabla(r)^T \cdot M_{k_e} + FD(r)\right)^2 + \sum_{e \in \mathcal{L}(\bar{n})} p_e \sum_{r \in e}\frac{\partial}{\partial M_{\bar{n}}}\left(\sum_{k \in V(e)}\varphi_{k_e}(r)\nabla(r)^T \cdot M_{k_e} + FD(r)\right)^2 =$$

$$\sum_{e \in S(\bar{n})} p_e \sum_{r \in e}\frac{\partial}{\partial M_{\bar{n}}}\left(\sum_{k \in V(e)}\varphi_{k_e}(r)\nabla(r)^T \cdot M_{k_e} + FD(r)\right)^2 + \sum_{e \in \mathcal{L}(\bar{n})} p_e \sum_{r \in e}\frac{\partial}{\partial M_{\bar{n}}}\left(\sum_{k \in V(e)}\varphi_{k_e}(r)\nabla(r)^T \cdot M_{k_e} + FD(r)\right)^2 =$$

$$2\sum_{e \in S(\bar{n})} p_e \sum_{r \in e}\left(\left(\frac{\partial}{\partial M_{\bar{n}}}\left(\sum_{k \in V(e)}\varphi_{k_e}(r)\nabla(r)^T \cdot M_{k_e} + FD(r)\right)\right)\left(\sum_{k \in V(e)}\varphi_{k_e}(r)\nabla(r)^T \cdot M_{k_e} + FD(r)\right)\right) +$$

$$2\sum_{e \in \mathcal{L}(\bar{n})} p_e \sum_{r \in e}\left(\left(\frac{\partial}{\partial M_{\bar{n}}}\left(\sum_{k \in V(e)}\varphi_{k_e}(r)\nabla(r)^T \cdot M_{k_e} + FD(r)\right)\right)\left(\sum_{k \in V(e)}\varphi_{k_e}(r)\nabla(r)^T \cdot M_{k_e} + FD(r)\right)\right) = 2\sum_{e \in S(\bar{n})} p_e \sum_{r \in e}$$

$$\left(\left(\varphi_{\bar{n}_e}(r)\nabla(r)\right)\left(\sum_{k \in V(e)}\varphi_{k_e}(r)\nabla(r)^T \cdot M_{k_e} + FD(r)\right)\right) + 2\sum_{e \in \mathcal{L}(\bar{n})} p_e \sum_{r \in e}\left(\left(a_{\bar{n}_e}(\underline{k})\varphi_{\bar{n}_e}(r)\nabla(r)\right)\left(\sum_{k \in V(e)}\varphi_{k_e}(r)\nabla(r)^T \cdot M_{k_e} + FD(r)\right)\right) =$$

$$2\sum_{e \in S(\bar{n})} p_e \sum_{r \in e}\left(\left(\varphi_{\bar{n}_e}(r)\nabla(r)\right)\left(\sum_{\bar{k} \in V(e)}\varphi_{\bar{k}_e}(r)\nabla(r)^T \cdot M_{\bar{k}_e} + \sum_{\underline{k} \in V(e)}\varphi_{\underline{k}_e}(r)\nabla(r)^T \cdot M_{\underline{k}_e} + FD(r)\right)\right) +$$

$$\sum_{e \in \mathcal{L}(\bar{n})} p_e \sum_{r \in e}\left(\left(\varphi_{\bar{n}_e}(r)\nabla(r)\right)\left(\sum_{\bar{k} \in V(e)}\varphi_{\bar{k}_e}(r)\nabla(r)^T \cdot M_{\bar{k}_e} + \sum_{\underline{k} \in V(e)}\varphi_{\underline{k}_e}(r)\nabla(r)^T \cdot M_{\underline{k}_e} + FD(r)\right)\right) =$$

$$2\sum_{e \in S(\bar{n})} p_e \sum_{r \in e}\left(\left(\varphi_{\bar{n}_e}(r)\nabla(r)\right)\left(\sum_{\bar{k} \in V(e)}\varphi_{\bar{k}_e}(r)\nabla(r)^T \cdot M_{\bar{k}_e} + \sum_{\underline{k} \in V(e)}\varphi_{\underline{k}_e}(r)\nabla(r)^T \cdot \frac{M_{\overline{J_0}(\underline{k})} + M_{\overline{J_0}(\underline{k})}}{2} + FD(r)\right)\right) +$$

$$\sum_{e \in \mathcal{L}(\bar{n})} p_e \sum_{r \in e}\left(\left(\varphi_{\bar{n}_e}(r)\nabla(r)\right)\left(\sum_{\bar{k} \in V(e)}\varphi_{\bar{k}_e}(r)\nabla(r)^T \cdot M_{\bar{k}_e} + \sum_{\underline{k} \in V(e)}\varphi_{\underline{k}_e}(r)\nabla(r)^T \cdot \frac{M_{\overline{J_0}(\underline{k})} + M_{\overline{J_0}(\underline{k})}}{2} + FD(r)\right)\right) =$$

$$2\sum_{e \in S(\bar{n})} p_e \sum_{r \in e}\sum_{\bar{k} \in V(e)}\varphi_{\bar{k}_e}(r)\varphi_{\bar{n}_e}(r)\nabla(r) \cdot \nabla(r)^T \cdot M_{\bar{k}_e} + 2\sum_{e \in S(\bar{n})} p_e \sum_{r \in e}\sum_{\underline{k} \in V(e)}\varphi_{\underline{k}_e}(r)\varphi_{\bar{n}_e}(r)\nabla(r) \cdot \nabla(r)^T \cdot \frac{M_{\overline{J_0}(\underline{k})} + M_{\overline{J_0}(\underline{k})}}{2} +$$

$$2\sum_{e \in S(\bar{n})} p_e \sum_{r \in e}\varphi_{\bar{n}_e}(r)\nabla(r)FD(r) + + \sum_{e \in \mathcal{L}(\bar{n})} p_e \sum_{r \in e}\sum_{\bar{k} \in V(e)}\varphi_{\bar{k}_e}(r)\varphi_{\bar{n}_e}(r)\nabla(r) \cdot \nabla(r)^T \cdot M_{\bar{k}_e} + +$$

-continued $$\sum_{e\in\mathcal{L}(\overline{n})} p_e \sum_{r\in e} \sum_{\underline{k}\in'V(e)} \varphi_{\underline{k}_e}(r)\varphi_{\overline{n}_e}(r)\nabla(r)\cdot\nabla(r)^T \cdot \frac{M_{\overline{J_0}(\underline{k})} + M_{\overline{J_0}(\underline{k})}}{2} ++ \sum_{e\in\mathcal{L}(\overline{n})} p_e \sum_{r\in e} \varphi_{\overline{n}_e}(r)\nabla(r)FD(r)$$

Then $$\frac{\partial E}{\partial M_n} = 0$$

is equivalent to $$\Sigma_{e\in S(\overline{n})} p_e \Sigma_{\overline{k}\in v(e)} \Sigma_{r\in e} \varphi_{\overline{k}_e}(r)\varphi_{\overline{n}_e}(r)\nabla(r)\cdot\nabla(r)^T \cdot M_{\overline{k}_e}$$

$$+\frac{1}{2}\Sigma_{e\in S(\overline{n})} p_e \Sigma_{\underline{k}\in v(e)} \Sigma_{r\in e} \varphi_{\underline{k}_e}(r)\varphi_{\overline{n}_e}(r)\nabla(r)\cdot\nabla(r)^T \cdot \left(M_{\overline{J_0}(\underline{k})} + M_{\overline{J_0}(\underline{k})}\right)$$

$$+\frac{1}{2}\Sigma_{e\in\mathcal{L}(\overline{n})} p_e \Sigma_{\overline{k}\in v(e)} \Sigma_{r\in e} \varphi_{\overline{k}_e}(r)\varphi_{\overline{n}_e}(r)\nabla(r)\cdot\nabla(r)^T \cdot M_{\overline{k}_e} \qquad =$$

$$+\frac{1}{4}\Sigma_{e\in\mathcal{L}(\overline{n})} p_e \Sigma_{\underline{k}\in v(e)} \Sigma_{r\in e} \varphi_{\underline{k}_e}(r)\varphi_{\overline{n}_e}(r)\nabla(r)\cdot\nabla(r)^T \cdot \left(M_{\overline{J_0}(\underline{k})} + M_{\overline{J_0}(\underline{k})}\right)$$

$$-\Sigma_{e\in S(\overline{n})} p_e \Sigma_{r\in e} \varphi_{\overline{n}_e}(r)\nabla(r)FD(r)$$

$$-\frac{1}{2}\Sigma_{e\in\mathcal{L}(\overline{n})} p_e \Sigma_{r\in e} \varphi_{\overline{n}_e}(r)\nabla(r)FD(r)$$

This can be rewritten as:

$$\Sigma_{e\in S(\overline{n})} p_e \Sigma_{\underline{k}\in v(e)} \begin{pmatrix} G_{x,x}^{\overline{k},\overline{n}} & G_{x,y}^{\overline{k},\overline{n}} \\ G_{x,y}^{\overline{k},\overline{n}} & G_{y,y}^{\overline{k},\overline{n}} \end{pmatrix} \begin{pmatrix} u_{\overline{k}} \\ v_{\overline{k}} \end{pmatrix} +$$

$$\Sigma_{e\in\mathcal{L}(\overline{n})} p_e \Sigma_{\underline{k}\in v(e)} \Sigma_{r\in e} \varphi_{\underline{k}_e} \frac{1}{2} \begin{pmatrix} G_{x,x}^{\overline{k},\overline{n}} & G_{x,y}^{\overline{k},\overline{n}} \\ G_{x,y}^{\overline{k},\overline{n}} & G_{y,y}^{\overline{k},\overline{n}} \end{pmatrix} \begin{pmatrix} u_{\overline{k}} \\ v_{\overline{k}} \end{pmatrix}$$

$$\Sigma_{e\in S(\overline{n})} p_e \Sigma_{\underline{k}\in v(e)} \frac{1}{2} \begin{pmatrix} G_{x,x}^{\underline{k},\overline{n}} & G_{x,y}^{\underline{k},\overline{n}} \\ G_{x,y}^{\underline{k},\overline{n}} & G_{y,y}^{\underline{k},\overline{n}} \end{pmatrix} \begin{pmatrix} u_{\overline{J_0}(\underline{k})} \\ v_{\overline{J_0}(\underline{k})} \end{pmatrix} +$$

$$\Sigma_{e\in S(\overline{n})} p_e \Sigma_{\underline{k}\in v(e)} \frac{1}{2} \begin{pmatrix} G_{x,x}^{\underline{k},\overline{n}} & G_{x,y}^{\underline{k},\overline{n}} \\ G_{x,y}^{\underline{k},\overline{n}} & G_{y,y}^{\underline{k},\overline{n}} \end{pmatrix} \begin{pmatrix} u_{\overline{J_1}(\underline{k})} \\ v_{\overline{J_1}(\underline{k})} \end{pmatrix} =$$

$$\Sigma_{e\in\mathcal{L}(\overline{n})} p_e \Sigma_{\underline{k}\in v(e)} \frac{1}{4} \begin{pmatrix} G_{x,x}^{\underline{k},\overline{n}} & G_{x,y}^{\underline{k},\overline{n}} \\ G_{x,y}^{\underline{k},\overline{n}} & G_{y,y}^{\underline{k},\overline{n}} \end{pmatrix} \begin{pmatrix} u_{\overline{J_0}(\underline{k})} \\ v_{\overline{J_0}(\underline{k})} \end{pmatrix} +$$

$$\Sigma_{e\in\mathcal{L}(\overline{n})} p_e \Sigma_{\underline{k}\in v(e)} \frac{1}{4} \begin{pmatrix} G_{x,x}^{\underline{k},\overline{n}} & G_{x,y}^{\underline{k},\overline{n}} \\ G_{x,y}^{\underline{k},\overline{n}} & G_{y,y}^{\underline{k},\overline{n}} \end{pmatrix} \begin{pmatrix} u_{\overline{J_1}(\underline{k})} \\ v_{\overline{J_1}(\underline{k})} \end{pmatrix}$$

$$-\Sigma_{e\in S(\overline{n})} p_e \begin{pmatrix} F_x^{\overline{n}} \\ F_y^{\overline{n}} \end{pmatrix} - \frac{1}{2}\Sigma_{e\in\mathcal{L}(\overline{n})} p_e \begin{pmatrix} F_x^{\overline{n}} \\ F_y^{\overline{n}} \end{pmatrix}$$

where $G_{x,y}^{k,n} = \Sigma_{r\in e} \varphi_{k_e}(r)\varphi_{n_e}(r)\nabla_x(r)\nabla_y(r)$ and $F_x^k = \Sigma_{r\in e} \varphi_{k_e}(r)\nabla_x(r)FD(r)$ Looking at the solution, even if attractive because the dimension of the problem (number of variables) is lower compared to the unconstrained problem it remains very complex in terms of implementation.

Annex 3
Optical Flow: Equation Generalization with Slaves+Intra Probability
Finding the set of optimal nodes $$\mathbb{M}* = \min_{\mathbb{M}} E$$

can involve solving $\mathbb{A} \cdot \mathbb{M} = \mathbb{B}$.

Additional constraints are a set of new equations. For a slave node, two nodes $j_0(\underline{k})$ and $j_1(\underline{k})$ (they could be master of slaves) can be used for the computation of the motion M $\overline{k}$ are such that:

$$M_{\underline{k}} = \frac{M_{j_0(\underline{k})} + M_{j_1(\underline{k})}}{2}$$

This can be rewritten as the equation: 2 $M_{\underline{k}}$−$M_{j_0(\underline{k})}$−$M_{j_1(\underline{k})}$=0.

Accounting for all the slave nodes, constraints can be written in a matrixial form: C·M=0, where, as in the unconstrained case, M is composed of the node motion vector coordinates. C is sparse where $c_{ij}$ composed of 2, −1 and 0 values (or opposite values).

The new problem can be written as:

$$M* = \min_{\mathbb{M}} E$$
$$s.t.\, \mathbb{CM} = 0$$

Using Lagrange description problem minimizing:

$$M*= \min_{\mathbb{M}}(E + \lambda^T \mathbb{CM})$$

The solution of the unconstrained problem in terms of solution is provided in FIG. 24, Introducing the constraints, it comes to solve an extended system $\mathbb{A}'\mathbb{M}'=\mathbb{B}'$ as shown in FIG. 13. The new composed matrix A' is also sparse and symmetric.

The intermediate $\lambda$ values are just ignored when extracting the M part of the solution. In the same manner, constrained motion vectors (slave nodes) can be readjusted from unconstrained motion vectors (master nodes) for accuracy reasons. This is not mandatory but can be done for accuracy reasons.

Annex 4
Optical Flow: Equation Generalization (Little Deformation) «Horn-Schunck-Like»
As an improvement compared to the Horn-Schunck approach, introducing a motion homogeneity constraint in the Mesh model does not require any user defined smoothing parameter to tune the algorithm behavior.

$$Ec = E + \lambda \cdot S$$

$S = \sum_{e \in \mathcal{D}} p_e \sum_{k \in V(e)} (M_{k_e} - \overline{M_e})^2$ avoiding too big deformations As set out in Annex 1:

$$\frac{\partial E}{\partial M_n} =$$

$$2\sum_{e \in S(n)} p_e \sum_{r \in e} \left( \left( \sum k \in v(e) \varphi_{k_e}(r) \varphi_{n_e}(r) \nabla(r) \cdot \nabla(r)^T \cdot M_{k_e} \right) + \varphi_{n_e}(r) \nabla(r) FD(r) \right)$$

$$\frac{\partial S}{\partial M_n} =$$

$$\frac{\partial}{\partial M_n} \sum_{e \in \mathcal{D}} p_e \sum k \in v(e) \left( M_{k_e} - \overline{M_e} \right)^2 \left( M_{k_e} - \overline{M_e} \right) = \frac{1}{c} \left( (C-1) M_{k_e} - \sum_{\substack{m \neq k \\ m \in v(e)}} M_{m_e} \right)$$

With C=Card(e)=4

Defining S(n), the set of finite elements having the node numbered n as vertex $$\frac{\partial S}{\partial M_n} = \frac{\partial}{\partial M_n} \sum_{e \in S(n)} p_e \sum_{k \in V(e)} \left( M_{k_e} - \overline{M_e} \right)^2 +$$

$$\underbrace{\frac{\partial}{\partial M_n} \sum_{e \notin S(n)} p_e \sum_{k \in v(e)} \left( M_{k_e} - \overline{M_e} \right)^2}_{=0, \text{because } k_e \neq n \text{ for } e \notin S(n)} =$$

$$\sum_{e \in S(n)} p_e \sum_{k \in V(e)} \frac{\partial}{\partial M_n} \left( M_{k_e} - \overline{M_e} \right)^2 =$$

$$2 \sum_{e \in S(n)} p_e \sum_{k \in V(e)} \frac{\partial \left( M_{k_e} - \overline{M_e} \right)}{\partial M_n} \left( M_{k_e} - \overline{M_e} \right) =$$

$$2 \sum_{e \in S(n)} p_e \left( \frac{\partial \left( M_n - \overline{M_e} \right)}{\partial M_n} \left( M_n - \overline{M_e} \right) + \sum_{\substack{k \in v(e) \\ k \neq n}} \frac{\partial \left( M_{k_e} - \overline{M_e} \right)}{\partial M_n} \left( M_{k_e} - \overline{M_e} \right) \right) =$$

$$2 \sum_{e \in S(n)} p_e \left( \left( 1 - \frac{1}{c} \right) (M_n - \overline{M_e}) + \sum_{\substack{k \in v(e) \\ k \neq n}} \left( -\frac{1}{c} \right) (M_{k_e} - \overline{M_e}) \right)$$

$$= 2 \sum_{e \in S(n)} p_e \left( M_n - \overline{M_e} - \sum_{k \in V(e)} \left( M_{k_e} - \overline{M_e} \right) \left( \frac{1}{c} \right) \right)$$

$$= 2 \sum_{e \in S(n)} p_e \left( M_n - \overline{M_e} - \frac{1}{c} \sum_{k \in V(e)} M_{k_e} + \underbrace{\frac{1}{c} \sum_{k \in V(e)} \overline{M_e}}_{\overline{M_e}} \right)$$

$$= 2 \sum_{e \in S(n)} p_e \left( M_n - \sum_{k \in V(e)} \frac{1}{c} M_{k_e} \right)$$

$$= 2 \sum_{e \in S(n)} p_e \left( \sum_{k \in V(e)} \frac{1}{c} M_n - \sum_{k \in V(e)} \frac{1}{c} M_{k_e} \right)$$

$$= 2 \sum_{e \in S(n)} p_e \frac{1}{c} \left( \sum_{k \in V(e)} \left( M_n - M_{k_e} \right) \right)$$

$$\lambda = \frac{\beta}{C}$$

Then $$\frac{\partial E_c}{\partial M_n} = 0$$

is equivalent to $$\sum_{e \in S(n)} p_e \sum_{k \in V(e)} \left\{ \left( \left( \sum_{r \in e} \varphi_{k_e}(r) \varphi_{n_e}(r) \nabla(r) \cdot \nabla(r)^T \right) - \lambda \right) \cdot M_{k_e} + \lambda M_n \right\}$$

$$= -\sum_{e \in S(n)} p_e \sum_{r \in e} \varphi_{n_e}(r) \nabla(r) FD(r)$$

It can be rewritten for a better readability as:

$$\sum_{e \in S(n)} p_e \left[ \begin{pmatrix} \lambda \cdot C & 0 \\ 0 & \lambda \cdot C \end{pmatrix} \begin{pmatrix} u_n \\ v_n \end{pmatrix} + \sum_{k \in V(e)} \begin{pmatrix} G_{x,x}^{k,n} - \lambda & G_{x,y}^{k,n} \\ G_{x,y}^{k,n} & G_{y,y}^{k,n} - \lambda \end{pmatrix} \begin{pmatrix} u_k \\ v_k \end{pmatrix} \right]$$

$$= -\sum_{e \in S(n)} p_e \begin{pmatrix} F_x^n \\ F_y^n \end{pmatrix}$$

where $G_{x,y}^{k,n} = \sum_{r \in e} \varphi_{k_e}(r) \varphi_{n_e}(r) \nabla_x(r) \nabla_y(r)$ Annex 5

Optical Flow: Equation Generalization (3 Ctrl Pts+Continuity)

It is a particular case of general equations with slave nodes (see Annex 3): the fourth node (bottom right in each rectangle) can be considered as a slave node.

First: the relation between nodes in the affine model case is:

$$M_{3_e} \overset{\triangle}{=} M_{1_e} + M_{2_e} - M_{0_e}$$

And the continuity constraint is:

$$M_{3_e} = M_{0_{e\_bottom\_right}}$$

The constraint to apply per element e is:

$$M_{0_{e\_bottom\_right}} = M_{1_e} + M_{2_e} - M_{0_e}$$

Then the process solves the system $\mathbb{A} \, '\mathbb{M}' = \mathbb{B}'$, as described in Annex 3.

What is claimed is:

1. A computer-implemented system for probabilistic mesh motion estimation, the system comprising:
at least one processor; and
memory in communication with the at least one processor, the memory storing software code, which when executed by the at least one processor causes the processor to process video data to estimate motion in one or more locations of the video data using probabilistic mesh motion estimation based on a motion model, the probabilistic mesh motion estimation using a mesh as a motion vector field to estimate motion at the one or more locations of the video data, the mesh defining finite elements representing defined shapes of reference areas for motion estimation, wherein the motion model comprises weights representing probabilities that the one or more locations in the video data are intra-regions or inter-regions to indicate a confidence of the finite elements being inter-associated.

2. The computer-implemented system of claim 1 further comprising a transceiver for receiving and transmitting the video data.

3. The computer-implemented system of claim 1 wherein the memory stores the video data.

4. The computer-implemented system of claim 1 wherein the processor is an encoder, the encoder comprising a preprocessor, a look-ahead, and a codec.

5. The computer-implemented system of claim 1 wherein the processor introduces the weights inter-probability in the motion model for appearing areas in the video data in conjunction with using the probabilistic mesh motion estimation.

6. The computer-implemented system of claim 1 wherein the processor uses master and slave nodes and over-splitting for mesh continuity preservation, wherein the master nodes are movable nodes and the slave nodes are constrained nodes with motion that can be computed from their connected master nodes.

7. The computer-implemented system of claim 4 wherein the encoder uses a non fully connected mesh applicable to video coding standards for compression and preprocessing.

8. The computer-implemented system of claim 1 wherein the processor implements dedicated splitting for motion continuity preservation.

9. The computer-implemented system of claim 4 wherein the encoder uses the probabilistic mesh motion estimation for compression of the video data.

10. The computer-implemented system of claim 4 wherein the look-ahead implements the probabilistic mesh motion estimation.

11. The computer-implemented system of claim 4 wherein the codec implements the probabilistic mesh motion estimation.

12. The computer-implemented system of claim 4 wherein the preprocessor implements the probabilistic mesh motion estimation.

13. The computer-implemented system of claim 1, wherein the processor partitions the mesh to refine motion at a location in the mesh, wherein the processor uses continuous mesh splitting to partition the mesh without introducing discontinuities into the mesh.

14. A computer-implemented method for probabilistic mesh motion estimation, the method comprising:

processing video data to estimate motion in one or more locations of the video data using probabilistic mesh motion estimation based on a motion model, the probabilistic mesh motion estimation using a mesh as a motion vector field to estimate motion at the one or more locations of the video data, the mesh defining finite elements representing defined shapes of reference areas for motion estimation, wherein the motion model comprises weights representing probabilities that the one or more locations in the video data are intra-regions or inter-regions to indicate a confidence of the finite elements being inter-associated; and transmitting or storing the video data.

15. The method of claim 14 further comprising partitioning the mesh to refine motion at the location in the mesh, wherein the partitioning involves using continuous mesh splitting to partition the mesh without introducing discontinuities into the mesh.

\*  \*  \*  \*  \*